US008484615B2

(12) United States Patent
Cramb et al.

(10) Patent No.: US 8,484,615 B2
(45) Date of Patent: Jul. 9, 2013

(54) SOFTWARE FRAMEWORK TO BUILD AN EXECUTABLE SCHEME IN A GUI ENVIRONMENT

(75) Inventors: Jamie D. Cramb, Dundee (GB); Colin G. Herkes, Fife (GB)

(73) Assignee: NCR Corporation, Duluth, GA (US)

( * ) Notice: Subject to any disclaimer, the term of this patent is extended or adjusted under 35 U.S.C. 154(b) by 1256 days.

(21) Appl. No.: 12/004,396

(22) Filed: Dec. 20, 2007

(65) Prior Publication Data

US 2009/0164969 A1    Jun. 25, 2009

(51) Int. Cl.
*G06F 9/44* (2006.01)
*G06F 9/45* (2006.01)

(52) U.S. Cl.
USPC ............................ 717/120; 717/104; 717/121

(58) Field of Classification Search
USPC .......... 717/101–102, 120–122, 143, 104–107
See application file for complete search history.

(56) References Cited

U.S. PATENT DOCUMENTS

| | | | | |
|---|---|---|---|---|
| 6,601,233 B1 * | 7/2003 | Underwood | | 717/102 |
| 6,662,357 B1 * | 12/2003 | Bowman-Amuah | | 717/120 |
| 6,978,463 B2 * | 12/2005 | Yanosy | | 719/318 |
| 7,107,574 B1 * | 9/2006 | Nedbal | | 717/120 |
| 7,546,576 B2 * | 6/2009 | Egli | | 717/106 |
| 7,577,934 B2 * | 8/2009 | Anonsen et al. | | 717/102 |
| 7,614,040 B2 * | 11/2009 | Wagner et al. | | 717/120 |
| 7,703,073 B2 * | 4/2010 | Illowsky et al. | | 717/121 |
| 7,721,272 B2 * | 5/2010 | Mockford | | 717/140 |
| 7,730,446 B2 * | 6/2010 | Anonsen et al. | | 717/104 |
| 7,743,363 B2 * | 6/2010 | Brumme et al. | | 717/120 |
| 7,797,689 B2 * | 9/2010 | Mockford | | 717/151 |
| 7,840,944 B2 * | 11/2010 | Brunswig et al. | | 717/124 |
| 7,926,030 B1 * | 4/2011 | Harmon | | 717/121 |
| 7,937,685 B2 * | 5/2011 | Weil et al. | | 717/103 |
| 7,971,180 B2 * | 6/2011 | Kreamer et al. | | 717/101 |
| 8,181,156 B1 * | 5/2012 | Bobykin et al. | | 717/120 |
| 8,296,721 B2 * | 10/2012 | Sivaram | | 717/104 |
| 8,341,593 B2 * | 12/2012 | Fildebrandt et al. | | 717/105 |

OTHER PUBLICATIONS

Chang et al, "A practical management framework for commercial software development with opne sources", IEEE, pp. 164-171, 2010.*
Murray et al, "An approach to specifying software frameworks", ACM, pp. 185-192, 2004.*
Chang et al, "A case study of pattern based software framework to improve the quality of software development", ACM SAC, pp. 443-447, 2009.*
Remmel et al, "Supporting the testing of scientific frameworks with software product liine engineering a proposed approach", ACM—SE-SCE, pp. 10-18, 2011.*
Sherry Shavor et al.: "Eclipse: Anwendungen and Plug-Ins mit Java entwickeln (pp. 116-121)", 2004, 2004, Addison-Wesley, Munchen, XP002526764, ISBN: 3-8273-2125-5, p. 116, line 37—p. 229, col. 33.

* cited by examiner

*Primary Examiner* — Anil Khatri
(74) *Attorney, Agent, or Firm* — Paul W. Martin

(57) ABSTRACT

A software framework comprises at least one software tool and at least one parameter associated with each tool. The framework is arranged to (i) allow the selection of at least one software tool from a plurality of tools, (ii) allow the selection of at least one parameter from a parameter set, (iii) associate the parameter with a selected tool, and (iv) associate the selected tools and parameters together in a scheme such that they can be executed as a batch.

15 Claims, 22 Drawing Sheets

Security Assessment Tool

File  Tools  Settings

Network and apps ▶ ? Select

Security tools
- Network
  - nmap
    - -v -A scanme.nmap.org
    - -sP scanme.nmap.org
  - netstat
    - -a
    - -b
  - ipconfig
  - psgetsid
  - psfile
  - scanhosts
- Application
  - Psinfo
  - tasklist
  - pslist
  - psservice
  - TOKENMON

402

| Tool | Parameters |
|---|---|
| nmap | v A scanme nma - |
| netstat | -A |
| ipconfig | /all |
| scanhosts | no params |
| tasklist | /SVC |
| psservice | no params |
| psloggedon | -l |
| psloggedon | - |
| runnoplist | no params |
| pinfo | no params |

404

Create scheme   Clear scheme

Open Ports Table

This table shows a list of open ports found by the selected tools

| Port | Protocol | State | Service | Version | More info | Tool name |
|---|---|---|---|---|---|---|
| epmap | TCP | LISTENING | | | More info | netstat: -a |
| microsoft-ds | TCP | LISTENING | | | More info | netstat: -a |
| 1029 | TCP | LISTENING | | | More info | netstat: -a |
| 1034 | TCP | ESTABLISHED | | | More info | netstat: -a |
| 1035 | TCP | ESTABLISHED | | | More info | netstat: -a |
| 1036 | TCP | LISTENING | | | More info | netstat: -a |
| 1037 | TCP | ESTABLISHED | | | More info | netstat: -a |
| 1038 | TCP | ESTABLISHED | | | More info | netstat: -a |
| 1039 | TCP | ESTABLISHED | | | More info | netstat: -a |
| netbios-ssn | TCP | LISTENING | | | More info | netstat: -a |
| microsoft-ds | NDP | | | | More info | netstat: -a |
| salmp | NDP | | | | More info | netstat: -a |
| 4500 | NDP | | | | More info | netstat: -a |
| NTP | NDP | | | | More info | netstat: -a |
| 1025 | NDP | | | | More info | netstat: -a |
| 1999 | NDP | | | | More info | netstat: -a |
| ntp | NDP | | | | More info | netstat: -a |
| netbios-ssn | NDP | | | | More info | netstat: -a |
| netbios-$grm | NDP | | | | More info | netstat: -a |
| 1902 | TCP | ESTABLISHED | | | More info | netstat: -a |
| 1004 | TCP | ESTABLISHED | | | More info | netstat: -a |
| 1035 | TCP | ESTABLISHED | | | More info | netstat: -a |
| 1036 | TCP | ESTABLISHED | | | More info | netstat: -a |
| 1037 | TCP | ESTABLISHED | | | More info | netstat: -a |
| 1038 | TCP | ESTABLISHED | | | More info | netstat: -a |
| 1039 | TCP | ESTABLISHED | | | More info | netstat: -a |

408

© NCR Confidential 2006

MSAT Generated Report

⇦ Back     ⇨ Forwards

Discard report     Save report

406

Clear output

Save output

SOFTWARE FRAMEWORK TO BUILD AN EXECUTABLE SCHEME IN A GUI ENVIRONMENT

TECHNICAL FIELD

This invention relates to a computer implemented method for simplifying both the carrying out and the reporting of tasks.

BACKGROUND

Computers are used for tasks of ever increasing complexity. As computer systems and networks become more complicated, performing tasks such as assessing a software application for errors or assessing the security of the system also become more complicated. Often, in order to achieve a particular end, multiple software tools (which often utilize 'command-line' interfaces) are required.

Some users find command-line driven tools complicated to operate due to the fact that they usually require the user to know multiple command-line options/switches to perform a specific, relatively simple, task. Command-line driven tools and other graphical tools are often written to perform a specific task and it can take the combination of multiple tools before the user obtains all of the information he or she requires. Output from command-line tools can often be basic, hard to read and can contain more data than is required by the user. In addition, the output may not be in the format which is required or desired for further processing of the data. Automation of tools can often involve complex command-line statements which "pipe" information between applications. Potential for human error is increased with every command that is executed and with every option which is added to a tool.

An example of where multiple (and often complicated) command-line tools are required is in the software security field. There are many useful security tools which have been created as command-line tools which have multiple command-line options. An example is the software tool 'Nmap', a cross-platform network security scanner. Nmap's principle function is to evaluate the security of computers and to discover services or servers on a computer network.

It provides information about open ports on the network, the operating system, services running, etc. However, Nmap is quite complex to operate, having over 50 command-line options that can be used to identify potential security loopholes in systems and potentially producing tens or hundreds of lines of output even though only part of this information may be relevant to a user. For example, the user may only require the few lines of output that mention which ports are open, but will have to search the complete output to identify the information he or she requires.

If complex tasks are to be carried out by anyone other than a highly skilled operative, there is a need to simplify the operation of tasks. Therefore, there is a need to simplify the processes involved in running software tools (in particular command-lined based tools), in conjunction with one another to achieve a task, and in reporting the data returned by those tools.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention, there is provided a software framework arranged to build an executable scheme which comprises at least one software tool and at least one parameter associated with the or each tool, wherein the software framework is arranged to (i) allow the selection of at least one software tool from a plurality of tools, (ii) allow the selection of at least one parameter from a parameter set, (iii) associate the parameter with a selected tool, and (iv) associate the selected tool(s) and parameter(s) together in a scheme such that they can be executed as a batch.

As will be appreciated by the skilled person, a software framework is a reusable design platform for a software system (or subsystem). A software framework may have access to support programs, code libraries, a scripting language or other software to help develop and glue together the different components of a software project. Various parts of the framework may be exposed through an application programming interface (API).

The term 'tool' as used herein is intended to refer to a software tool. As will be familiar to the person skilled in the art, a software tool is a program or application, i.e. any type of executable code. For example, tools can be used to create, debug, manipulate, modify, analyze, identify or maintain other programs and applications. The term refers to relatively simple programs that can be combined together to accomplish a task.

The term 'parameter' as used herein is intended to mean a variable which specifies how a tool should operate. For example, a parameter may determine the speed at which a scanning tool operates, the programs identified by that tool, the breadth of a scan or the like.

Associating tools in accordance with the present invention allows a 'batch' of tools with associated parameters to be assembled with ease into a scheme. This scheme may then be executed by the user of the framework or by another user. This other user may not have the technical skills to populate the framework or to describe a scheme but could nevertheless cause the scheme to be executed, thus achieving a complex task with little need for skill or effort. A user will be able to reuse an assembled scheme to execute a batch of tools to carry out a task without the risk of an error occurring each time the task is carried out by, for example, forgetting to execute a tool or by entering an incorrect parameter. In addition, the user will not have to recall or to look up the parameters each time a scheme is assembled as these parameters will be held within the framework.

The framework may comprise a reporting means arranged to report the data returned following execution of the tools. This is advantageous as it allows the data to be read by the user.

In preferred embodiments, the reporting means is arranged to provide a plurality of output options. The options may comprise data format, data content, presentation of the data, order of the data and the like. The reporting means may be arranged to merge the output of the executed tools. Providing such a flexible reporting means is convenient as it allows a user to select an output which meets their individual requirements. In addition, being able to limit the data output will make the output easier to understand to a less-skilled user.

The reporting means may comprise parsing rules which identify which data should be included in a report and/or where in the report data should be placed. This is advantageous as it allows the report to be formatted automatically.

The framework may comprise a scheme building means arranged to place the selected tools/parameters into an order in which they are to be executed. As will be appreciated by the person skilled in the art, some schemes will benefit from having the tools arranged in a certain order. This is usually done by a skilled person using their own judgment. However, in one embodiment, the framework has access to predetermined rules which will determine the order of certain tools, in particular if this is critical or important for efficient execution of the scheme.

Preferably, the framework is arranged to associate the tools and/or parameters with information relating to that tool or parameter. The information may, for example, comprise an explanation of the tool and its function. Alternatively or additionally, the information may comprise a warning, for example where a known tool is likely to cause disruption to required network systems and/or services if executed with a certain parameter. The information may comprise information about other tools or parameters which work synergistically with other tools or parameters. This is advantageous as it allows a person building the scheme to access information about a tool and/or parameter which in turn will result in the scheme being fit for purpose.

The tools may be categorized. For example, the categories may comprise network tools, application tools, miscellaneous, 'no-group' or the like. Categorizing tools makes them easier to locate, for example within a list.

The scheme may be arranged to carry out a security assessment of a computer system or network. Alternatively or additionally, the tools may be arranged to carry out a status assessment of a network (i.e. to determine what programs are running, and the status of these programs). These are complex tasks that may otherwise require a number of tools to be executed separately.

In some embodiments, the framework is further arranged to allow a tool and/or parameter to be added to, altered and/or removed from the scheme of associated tools and parameters. This is advantageous as it allows a pre-existing scheme to be corrected, updated, or the like.

Preferably, the framework is arranged to allow tools and/or parameters available for selection to be added thereto. This is advantageous as it means that the framework is extensible and can contain tools which are developed after its launch.

In some embodiments, the framework is arranged to allow for the modification of existing tools, for example to add functionality to a tool. For example, a tool which carries out certain tasks but can be modified to carry out further or alternative tasks. This allows a user to base a new tool on previously existing tools which in turn reduces the skill and effort required to produce a new tool.

In one embodiment, the framework may incorporate a knowledge base arranged to interpret results returned on executing the schemes. This knowledge base may provide information where the results indicate a known security risk or the like. According to a second aspect of the present invention, there is provided a computer system comprising a framework interface means, a plurality of software tools, a parameter storage means arranged to store parameters and a scheme execution means, wherein: the computer system is arranged to allow a user to use the framework interface means to associate at least one parameter with a software tool and further to associate at least two of the software tools together in a scheme such that the associated software tools can be executed as a batch by the scheme execution means.

According to a third aspect of the invention, there is provided an Automated Teller Machine arranged to run a scheme built using a framework according to the first aspect of the invention.

This is advantageous as there are strict security and assessment requirements for Automated Teller Machines (ATMs)

In one embodiment, the framework is provided as part of the software installed on an ATM machine. In other embodiments, the scheme could be built and/or deployed remotely. Alternatively, the scheme could be built and/or run on a mobile assessment facility, such as a tablet PC.

In one particularly advantageous embodiment, the scheme may comprise a system assessment scheme (for example a system software inventory gathering scheme) arranged to provide information on the software of a plurality of ATMs. As the skilled person will appreciate, an ATM deployer or may provide hundreds or even thousands of ATMs in a network. It often occurs that, through poor record keeping or the like, the provider may not know what software is installed on which machines. Therefore, a scheme which is able to accumulate this information and report it is advantageous.

According to a fourth aspect of the present invention there is provide a method of carrying out a task requiring a plurality of software tools, the method comprising (i) selecting from a plurality of available tools the tools required to perform the task, (ii) selecting from a plurality of available parameters the parameters which are required by the tools to perform the task, (iii) arranging the tools and their associated parameters such that the tools can be executed in a batch as a scheme and (iv) executing the scheme.

In one embodiment, the step of executing the scheme is carried out following a single user instruction. The single user instruction may be provided via a Graphical User Interface (GUI) or via a command line. This is advantageous as it allows a simple method for executing all the tools required to perform a complex task.

In one embodiment, the task is a network security assessment. Alternatively or additionally, the tools may be arranged to carry out a status assessment of a network (i.e. to determine what services are running, and the status of these services). These are typical complex tasks that would otherwise require the use of multiple tools and the knowledge of many parameters.

Any aspect of the invention described above may incorporate features of other aspects of the invention as appropriate and as will be appreciated by the person skilled in the art.

BRIEF DESCRIPTION OF THE DRAWINGS

Embodiments of the invention will be described, by way of example, with reference to the following drawings, in which:

FIGS. 10 to 15 show screenshots of GUIs showing various steps in the process of reporting the data returned by the tools

Figure 1:
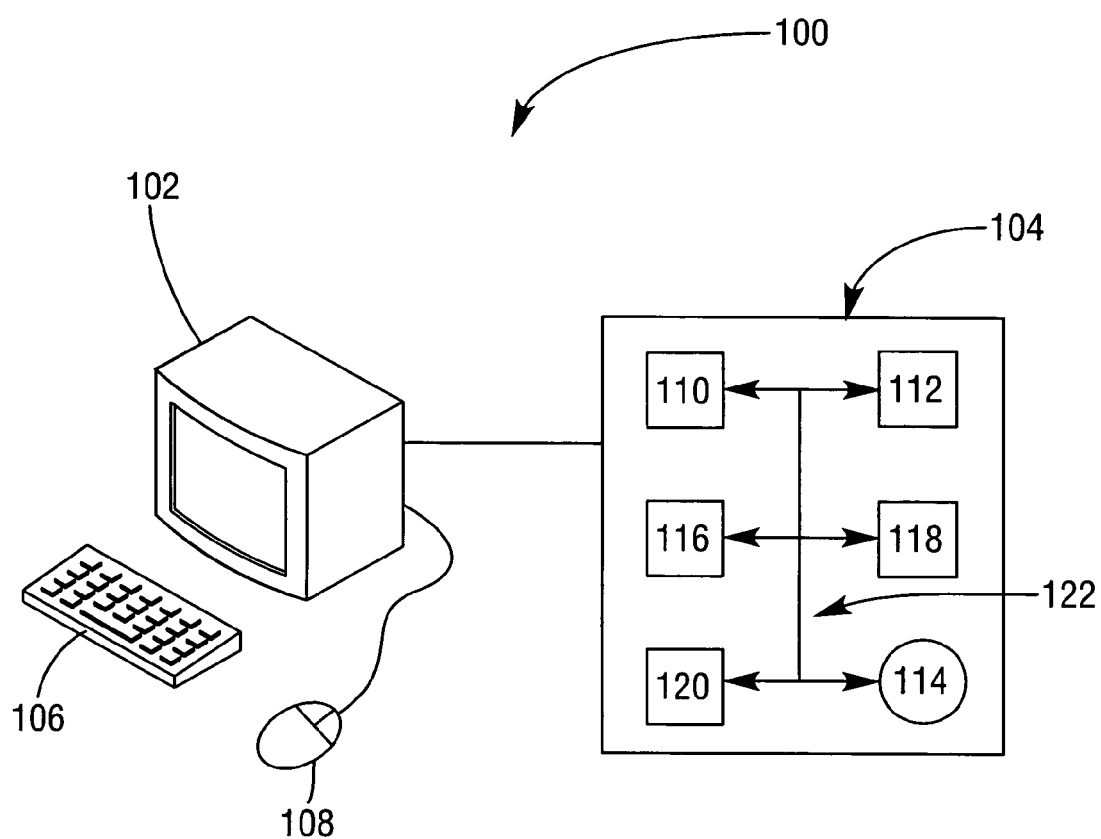
FIG. 1 shows a computer system capable of operating according to one embodiment of the present invention.

Common reference numerals are used throughout the figures to indicate similar features.

DETAILED DESCRIPTION

The computer system 100 of FIG. 1 comprises a screen 102 arranged to display data and processing circuitry 104 arranged to process data as described in greater detail below. The computer system 100 further comprises input means in the form of a key board 106 and a mouse 108.

The processing circuitry 104 comprises a display driver 110, a processing unit 112, a network connectivity port 114, a hard drive 116, a memory 118, an Input/Output (I/O) subsystem 120 and a system bus 122. The display driver 110, processing unit 112, network connectivity port 114, hard drive 116, memory 118 and I/O subsystem 120 communicate with each other via the system bus 122, which in this embodiment is a PCI bus, in a manner well known in the art. The network connectivity port 114 may be an IP port arranged to allow the computer to connect to the Internet or may be a connection to another type of network, such as an intranet. Such processing circuitry 104 may be provided by a number of different computer systems that are currently available.

Figure 2:
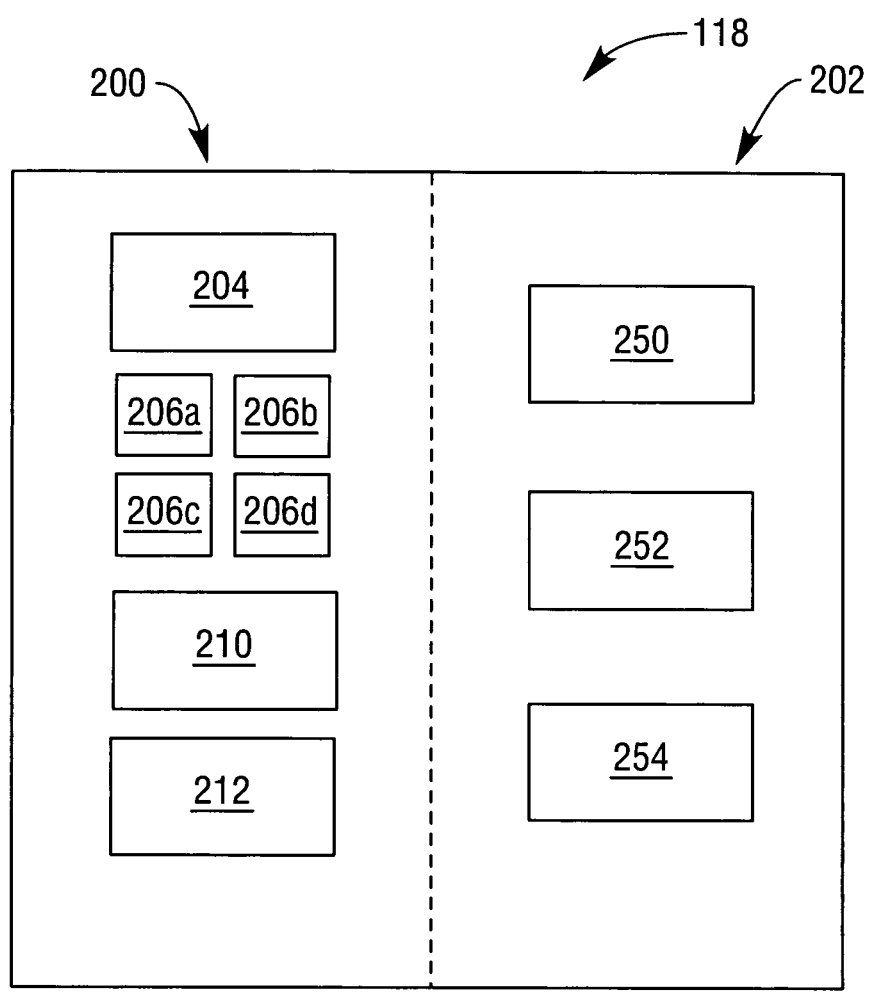
FIG. 2 shows detail of the memory of the computer system shown in FIG. 1.

FIG. 2 shows detail of the memory 118 of the computer system 100. The memory 118 comprises a program storage portion 200, which is allocated to program storage and is used to hold programming code that can be used to control the actions of the processing circuitry 104, and a user data storage portion 202, arranged to store data.

In this embodiment, the program code includes framework interface means 204, a plurality of tools 206a-d, a scheme execution means 210 and a report presentation means 212. The functions of these blocks will be expanded upon hereinafter.

The data storage portion 202 comprises a parameter storage means 250, a pre-built scheme storage means 252 and a tool/parameter attribute storage means 254. The function of these data stores will be expanded upon hereinafter.

The processing unit 112 can communicate with devices external to the processing circuitry 104 via network connection means provided by the I/O subsystem 120 and the Network connectivity port 114.

Figure 3:
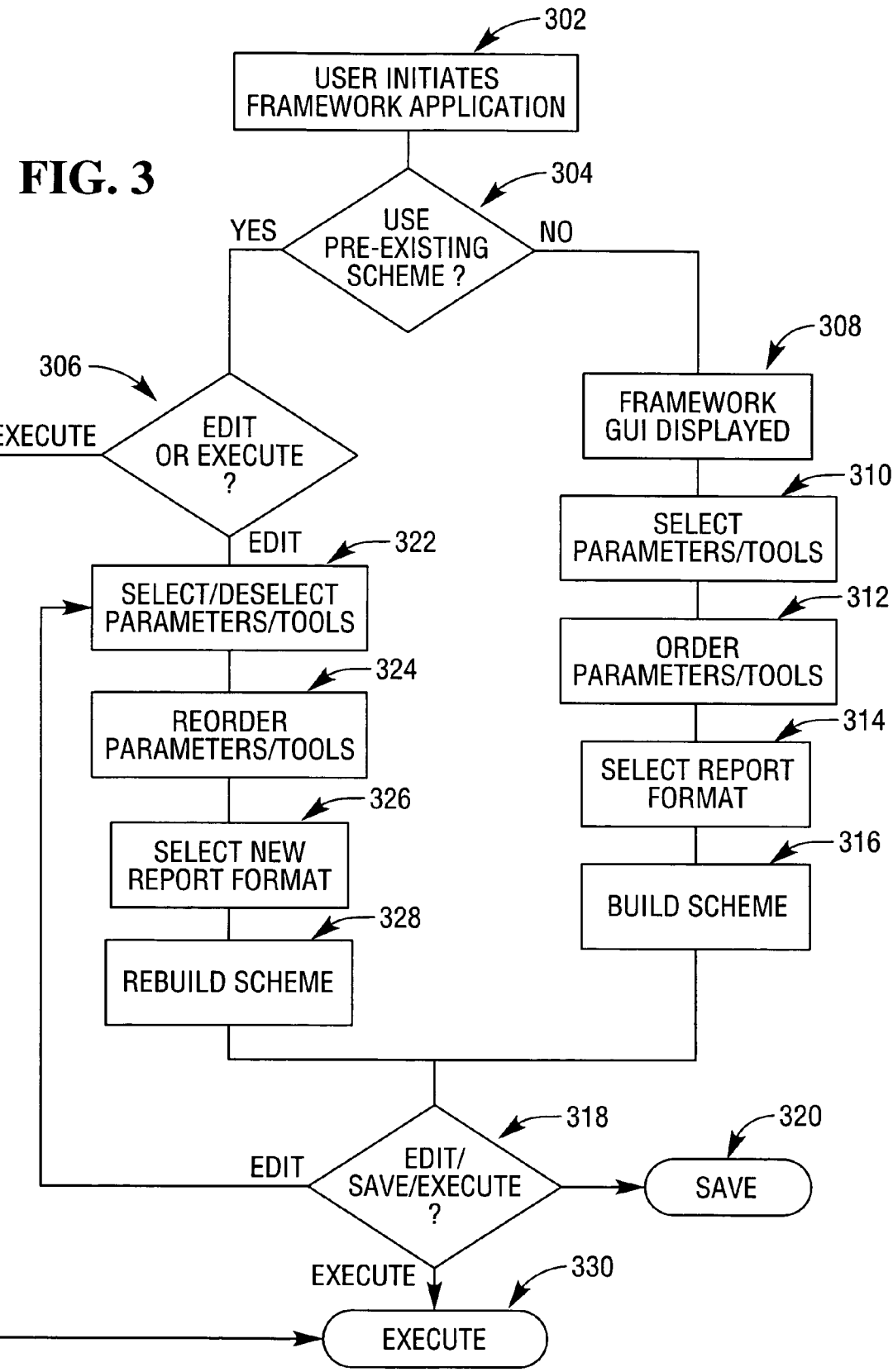
FIG. 3 shows a flowchart of steps in using a framework to associate various tools and parameters.

In this embodiment, the system is arranged to allow a scheme to be built which will then be saved and made available to other users such that the scheme can be repeatedly executed by a third party. Therefore, in this embodiment there are two classes of user, specifically an administrator who builds the scheme and an end user who executes the scheme through a 'one-click' interface. However, in other embodiments (as is described in greater detail below) there may not be a distinction between classes The flowchart of FIG. 3 shows steps undertaken by the administrator in using the framework to associate various tools 206 with one another to create a scheme, in order to perform a diagnostic task in accordance with one embodiment of the invention. In this embodiment, the administrator accesses the framework interface means 204 by inputting commands using the mouse 108 in step 302.

Figure 4:
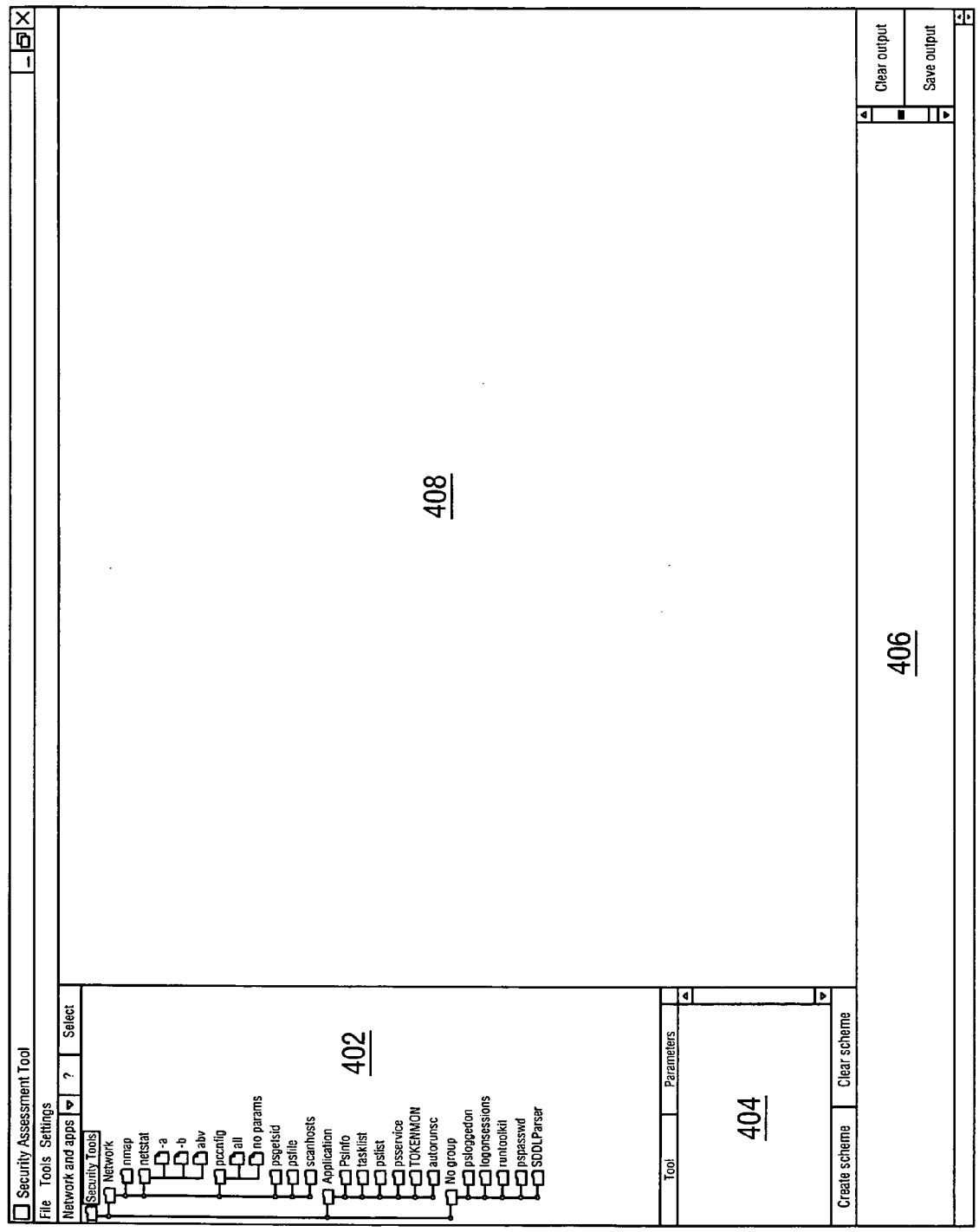
FIGS. 4 to 8 show screenshots of a GUI according to one embodiment of the invention

The administrator then makes a selection between using a pre-built scheme and building a new scheme in step 304. If a user selects the pre-built scheme, then this pre-built scheme is retrieved from the scheme storage means 252 and an edit/execution option is displayed on the screen 102 (step 306). If the administrator instead chooses to build a new scheme, a New Scheme GUI will be displayed (step 308), as is shown in FIG. 4.

The New Scheme GUI comprises four areas—a tool/parameter selection area 402, a selected tool parameter 404 area, an output area 406 and a reporting area 408. The user will select the desired tools 206 (some examples of tools 206 are described in greater detail below) from a tree structure hierarchy displayed in the tool/parameter selection area 402. In this embodiment, the lists comprise separate sections relating to a selection of network tools, a selection of application tools and a selection of 'no group' (unclassified tools) tools. The network tools are arranged to carry out scans of networks. Application tools are arranged to provide information on the software or other programs running on the networks.

As will be appreciated by the person skilled in the art, each of the tools 206 may have associated parameters, i.e. variables which specify how a tool should operate. For example, the third party network tool 'Netstat'™ can be run according to parameter '-a', which retrieves all active TCP connections and the TCP and UDP ports on which the computer is listening. Alternatively, or additionally, it can be run according to parameter '-b' which returns the binary (executable) program's name involved in creating each connection or listening port. The administrator can select which parameter provides information of interest. Some tools 206 may not require associated parameters to run, for example if there is only one way in which the tool can be run. All the parameters that may be required are stored in the Parameter storage means 250 along with an explanation of their function.

In this example (and as can be seen from the screenshots), the framework comprises network tools, application tools and 'no group' tools. The tools 206 comprise known, third party software tools. Specifically, the network tools include Nmap, Netstat™, IPconfig, PsGetSid, PsFile, and Scanhost. The application tools 208 include PsInfo, tasklist, PsList, PsService Tokenmon and AutorunSC. The 'no group' tools comprise PsLoggedOn, Logonsessions, runtoolkit, PsPasswd and an SDDL parser tool, called SDDL Parser herein. SDDL Parser is not a known third party software tool As will be familiar to the person skilled in the art, Netstat™ (a contraction of the words 'network statistics') is a command-line tool that displays network connections (both incoming and outgoing), routing tables, and a number of network interface statistics. IPconfig returns all the current TCP/IP network configuration values and refreshes the Dynamic Host Configuration Protocol (DHCP) and Domain Name System (DNS) settings. If it is used without parameters, IPconfig returns the IP address, subnet mask, and default gateway for all adapters. PsGetSid is a command-line tool which retrieves Security IDs (SIDs) across a network. PsFile is a command-line utility that shows a list of files on a system that are opened remotely, and it also allows you to close opened files either by name or by a file identifier. Scanhost (amongst other functions) retrieves Internet Protocol addresses of computers on the network.

Turning to the application tools, PsInfo is a command-line tool that gathers information about the local or remote Windows NT/2000™ system, for example the type of installation, kernel build, registered organization and owner, number of processors and their type, amount of physical memory, the install date of the system, and if its a trial version, the expiration date. PsList lists services running on a computer. PsService is a service viewer and controller for Windows which displays the status, configuration, and dependencies of a service, and allows a user to start, stop, pause, resume and restart them. PsService enables a user to logon to a remote system using a different account. Tokenmon is a application which monitors and displays a variety of security-related activity taking place on a system. Autorunsc returns information about what programs are configured to run during system bootup or login, and shows entries in the order that the Operating System processes them.

The 'no group' tools include PsLogged on, which is an applet that displays both the locally logged on users and users logged on via resources for either the local or a remote computer, Logonsessions, which lists the currently active logon sessions optionally the processes running in each session, PSpasswd, which is a tool that allows a user to change an account password on the local or remote systems. SDDL parser is security descriptor definition language (SDDL) parser which reads through a file containing the SDDL language, interpreting the SDDL language and displaying this interpretation in an understandable format. runrootkit is associated with the application RootkitRevealer, an advanced rootkit detection utility.

The tool/parameter selection area 402 provides a list of parameters for each tool as a submenu associated with each tool. The tools/parameters are selected as follows in step 310.

Figure 5:
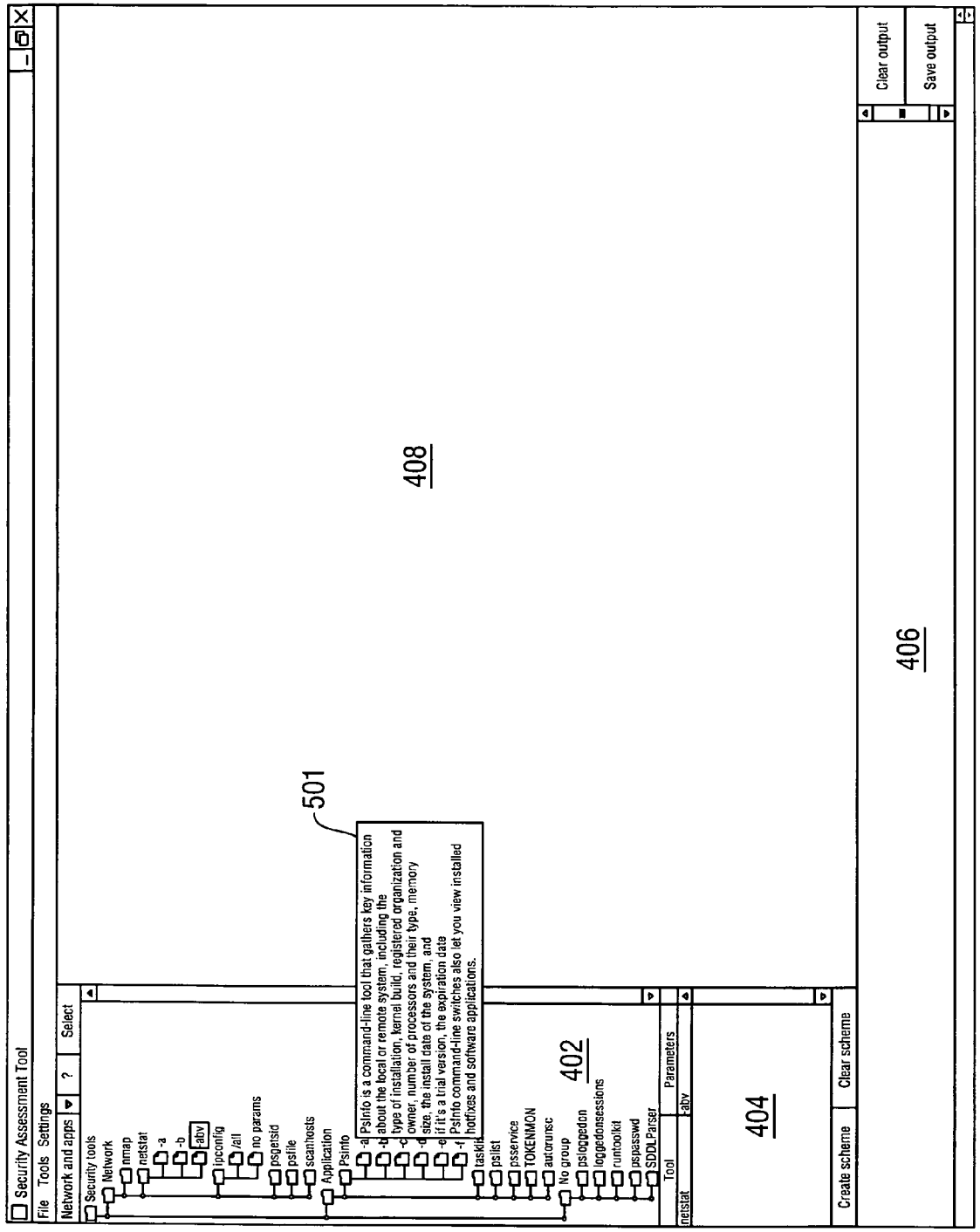
Figure 6:
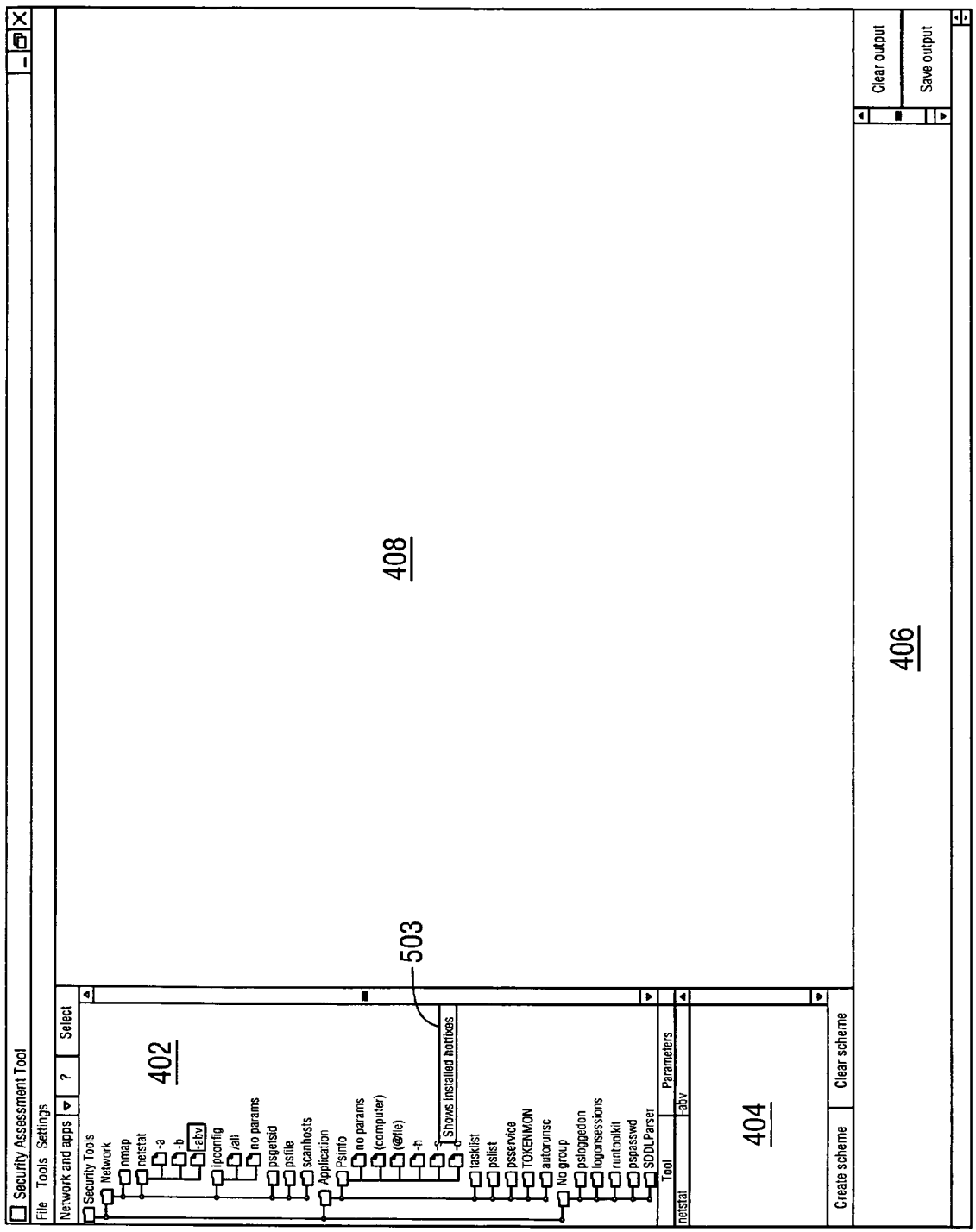

Once a tool and, if required, a parameter, has been identified, these can be moved to the selected tool area. In this embodiment, this is achieved by clicking on a parameter, which becomes highlighted on the GUI. If more information is required by the Administrator, this can be provided by hovering the pointer controlled by the mouse 108 over the tool/parameter name. This will cause stored information concerning the tool/parameter to be displayed in a textbox (this display of further information about a selectable item is known in the art as a 'tooltip') as shown in FIGS. 5 and 6. FIG. 5 shows a tooltip 501 associated with the tool PsInfo. FIG. 6 shows a tool tip 503 associated with the PsInfo-h parameter. If this is the desired parameter, the user 'double-clicks' on the parameter and the name of that tool with that parameter is displayed in the selected tool area 404. If all parameters for a particular tool are required, then the tool name may instead be 'double clicked' on by the user. This will result in all the possible tool/parameter options for that tool being selected and name of that tool will be displayed multiple times, i.e. once with each applicable parameter, in the selected tool area 404. The selected tool area 404 is shown populated with tools and parameters in FIGS. 7 and 8

The selected tool area 406 allows the tools 206 to be placed in an order for execution within the framework. For example, the administrator may know from his or her experience that it would be more efficient to run the tools in a given order. In some cases, one tool may be able, or required to, utilize the output of another tool, so a given order may be required. If this is the case then (in some embodiments of the invention) a warning would be displayed to the administrator, along with an option to allow the system to auto-arrange the tools on behalf of the administrator to include any dependency of one tool on another. The list shown in the selected tool area 404 in FIG. 6 represents the order in which the tools will be executed. Tools with their associated parameters can be moved up and down the list of tools in the selected tool area to change the order of execution (step 312). To achieve this, the administrator clicks on the name of a tool and, using the mouse 108 drags it to the desired location within the list.

Figure 7:
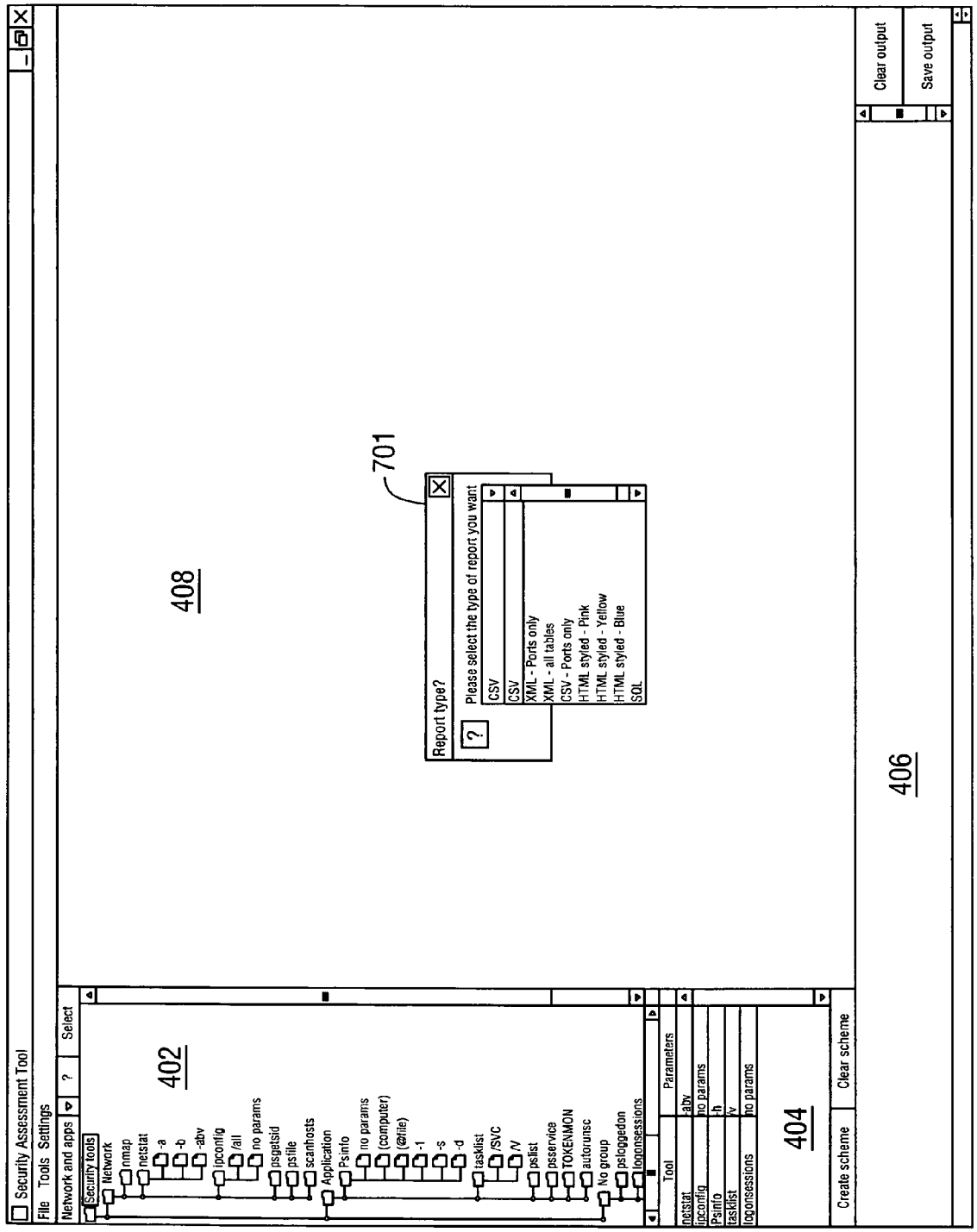

The next step 314 is to select a reporting format as is shown in FIG. 7. For example, the report format could be selected from (X)HTML, Word, PDF or the like from a GUI 701 with a drop down list. In addition, the administrator has the option to choose the content and order of the data supplied in the report. As will be appreciated by the skilled person, reporting the desired data in a specified manner will require the use of parsing tools. These tools will operate according to pre-defined rules. An example is a split rule, in which a line of output can be split-up based on particular character(s) in the line. For example this will result in the data being split when the output (e.g. two columns of data) separated by spaces. Another rule may be a keyline rule, in which output is split-up based on keywords in the output. A further example is a grid rule which specifies that output is split-up based on column position (e.g. take output starting from the 23rd character column in the output).

Once a user is satisfied with the selection and order of the tools and associated parameters and with the reporting format, the administrator can choose to build the scheme (step 316). As the skilled person will appreciate, building the scheme comprises accessing the code arranged to execute each tool and associating the various portions of code, and accessing code representing parsing means arranged to achieve the reporting format. In this embodiment, the code behind each tool is copied to a subdirectory of the framework, ready for the batch execution of the tools within the scheme. Further, the file is linked to a button GUI, such that clicking the button GUI causes the scheme to be executed.

Figure 8:
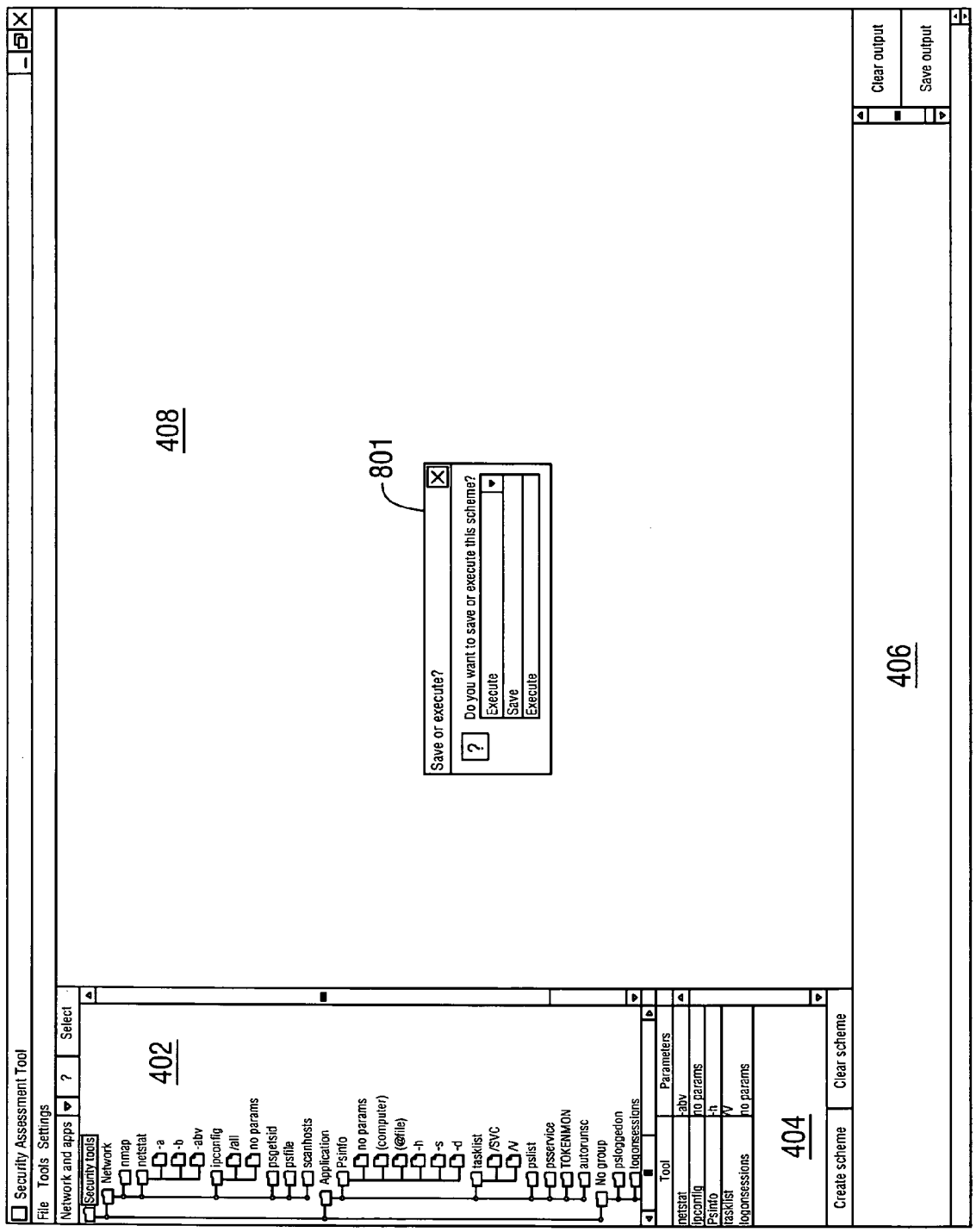

The administrator may then continue to edit the scheme or as is shown in FIG. 8, use a GUI 801, to choose to save or execute the scheme (step 318). If the administrator chooses to save the scheme (step 320), the scheme is saved in the pre-built scheme storage means 252. If instead the administrator chooses to edit the scheme, he or she will able to add or remove tools/parameters (step 322), or to reorder the tools (step 324) if desired. The process of selecting tools has been described above. To remove a tool with its associated parameter from a scheme, the administrator 'right-clicks' on the name of that tool with the mouse 108 in the selected tool area 404, which causes the tool to be deselected. The report format may be changed, if required, in step 326 and the scheme can then be rebuilt in step 328.

The administrator may chose to execute a scheme in step 330. This will then proceed in the same manner as execution of the scheme by an end user, as is now described.

Figure 9:
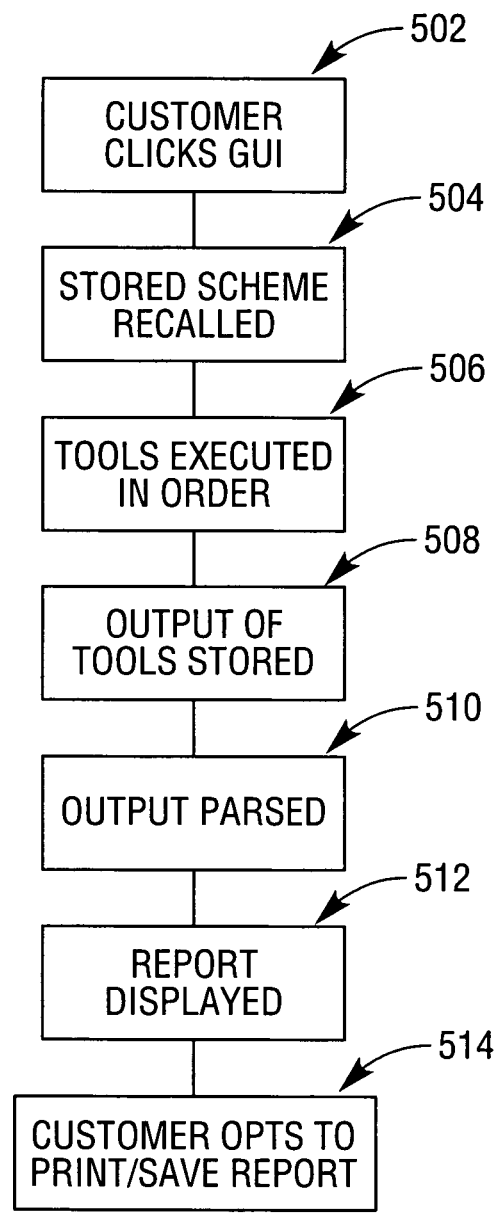
FIG. 9 shows a flowchart of the steps in executing associated tools.

The process of executing a scheme and producing a report is now described with reference to the flowchart of FIG. 9 and the screenshots of FIGS. 10 to 13.

When the 'one-click' GUI button is clicked by the end user, the scheme execution means 210 is called and the tools 206 in that scheme are executed as stored in the pre-built scheme storage means 252. As will be familiar to the person skilled in the art, this may involve a 'double click' input. The term 'one-click' is used in the art to refer to a single input which results in multiple processes being carried out. The processes carried out during execution of the tools 206 assembled within the scheme are described below with reference to FIG. 5.

Figure 10:
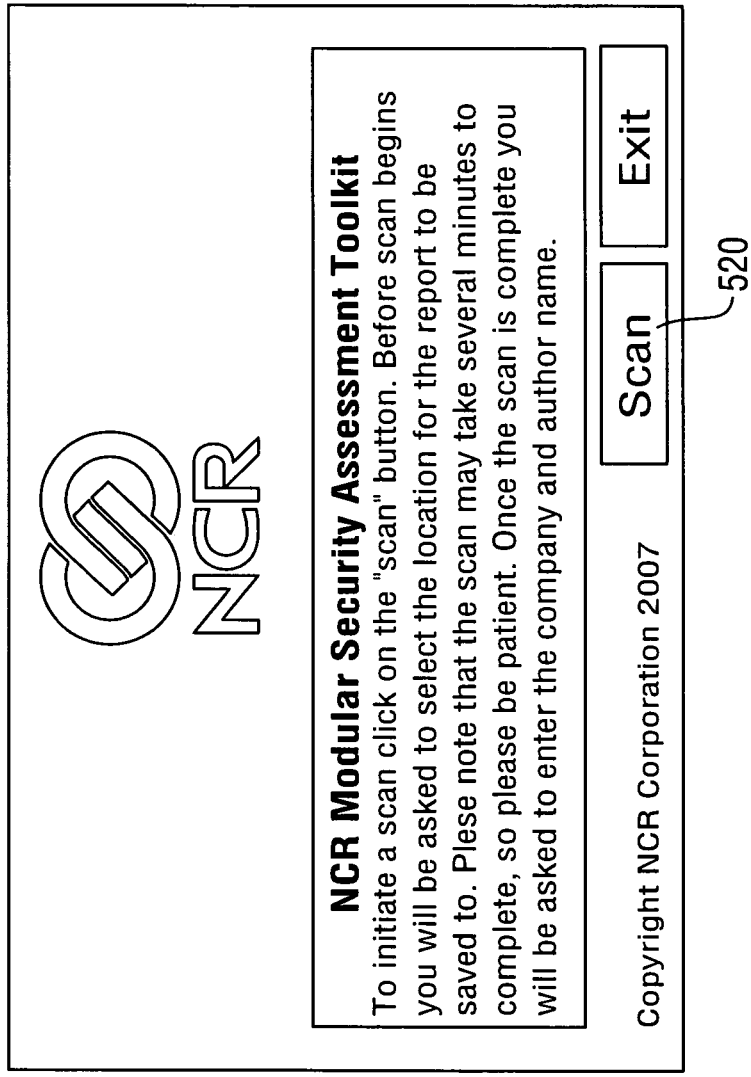

The end user is presented with a one button GUI as is shown in FIG. 10. On clicking on the scan button 520 (step 502), the code stored in the pre-built scheme storage means 252 is called to local memory within the end user's computer system (step 504). This may comprise accessing a local storage device such as a hard drive, or the scheme may be provided on a removable medium such as a DVD or memory stick. Alternatively, the scheme may be downloaded via a network. Clicking this button 520 is the only input required by the end user to cause the scheme to be executed.

Figure 11:
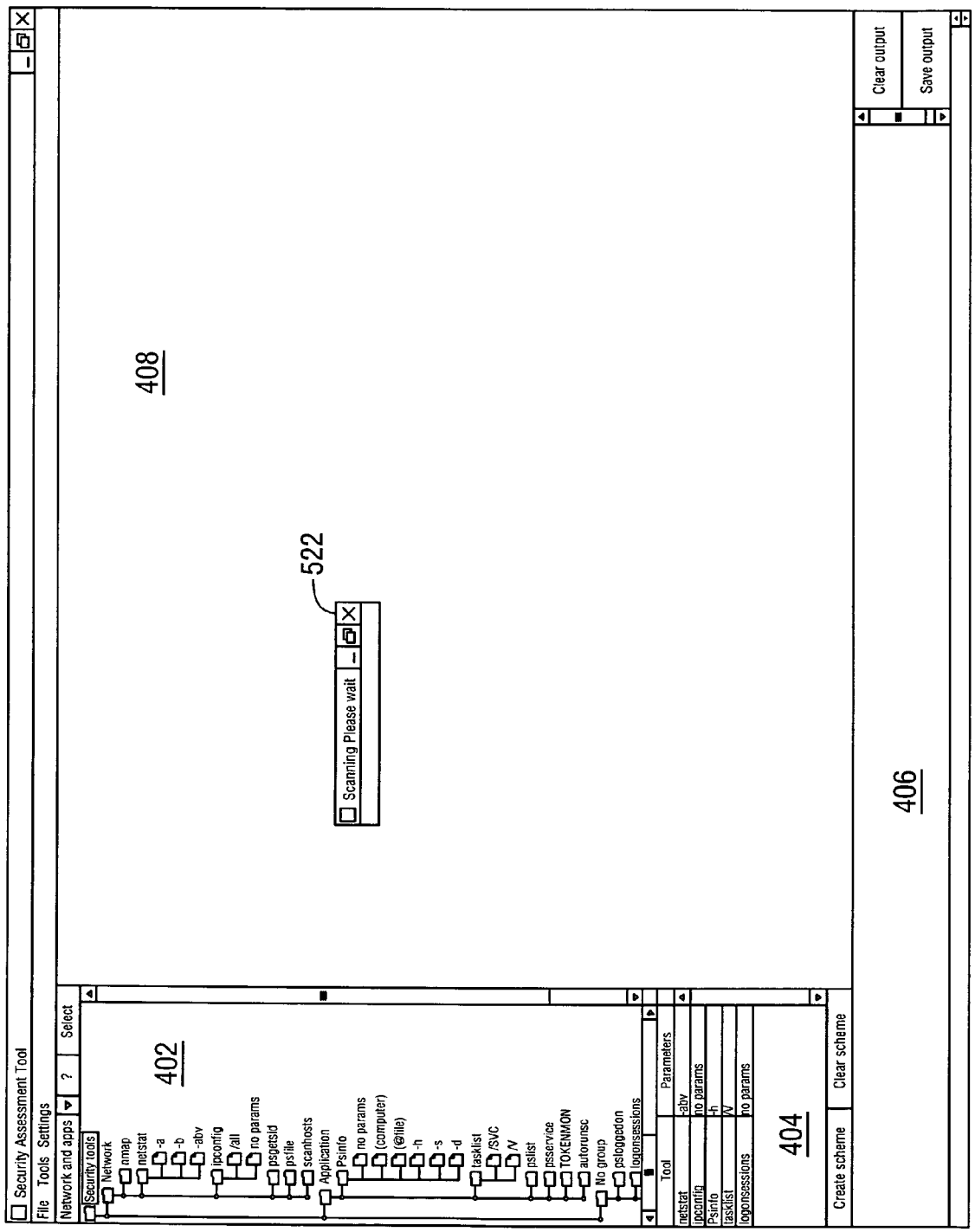
Figure 12:
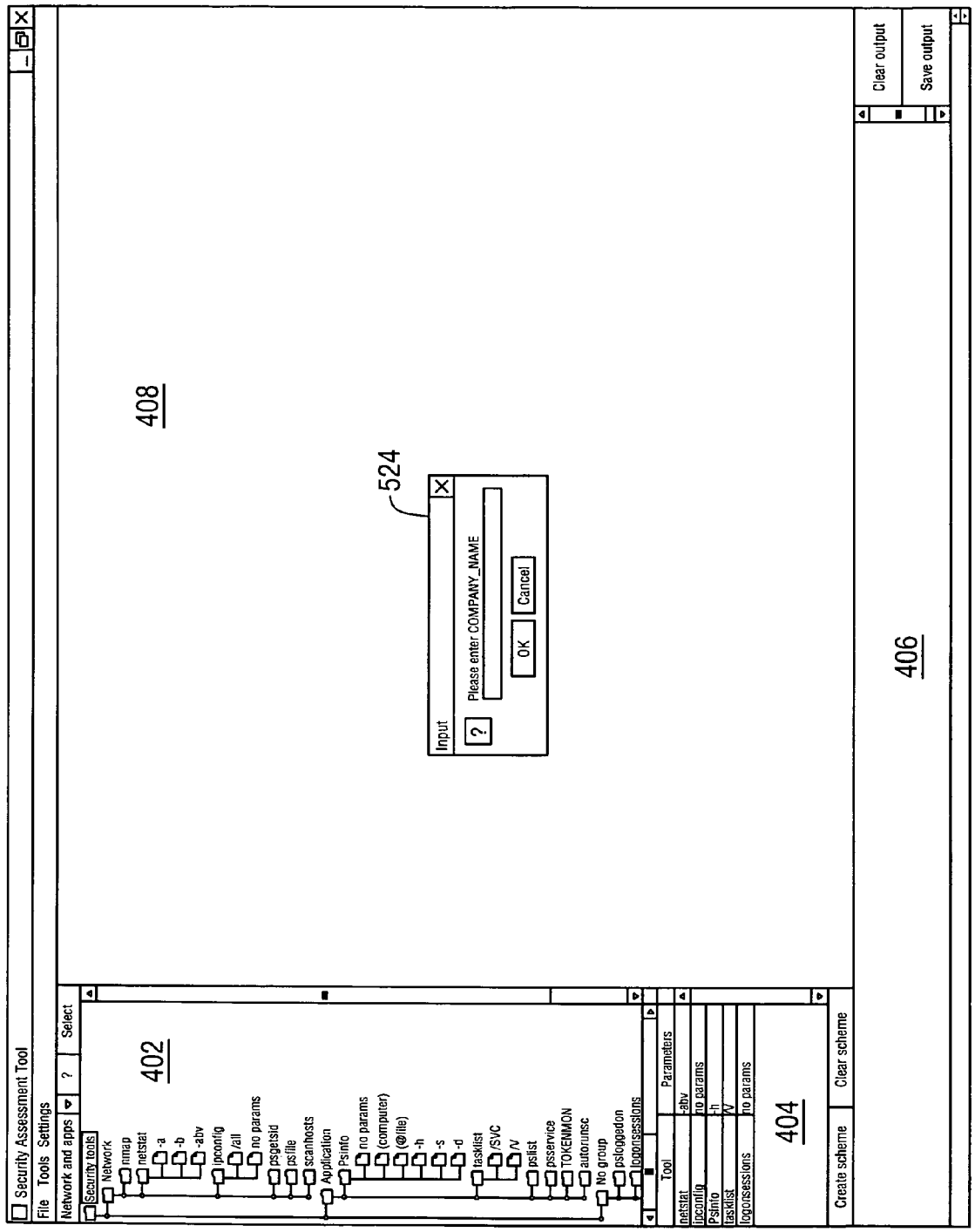
Figure 13:
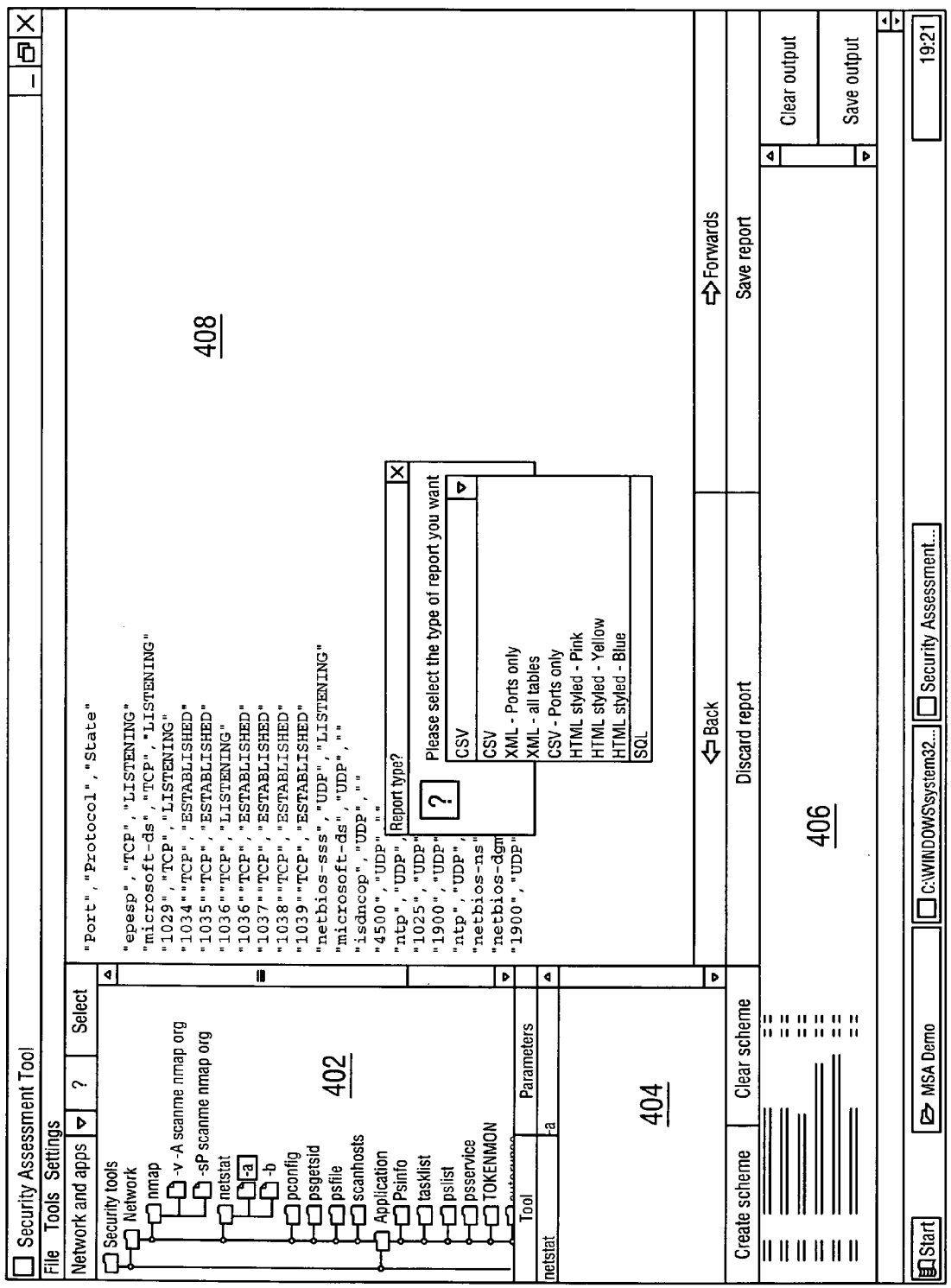

The tools which make up the scheme are then executed in the order defined when building the scheme and the returned output is stored and collated (step 508). Whilst this is carried out, a screen as shown in FIG. 11 is displayed to the end user with a message 522 asking the end user to wait. The end user is then asked to supply their company name via a GUI 524 as shown in FIG. 12 in order to personalize the report. The output is then parsed as defined in the rules behind the selected reporting format. The resulting report is displayed to the end user in step 512 (an example is shown in FIG. 13). The end user then opts to print or to save the report as required (step 514).

FIG. 13 shows a screenshot of a report following execution of a scheme from within the framework GUI (i.e. the form in which an administrator would receive a report, rather than that in which an end user would receive a report). This report is in simple Comma-Separated Variable (CSV) format. Although this is common method of reporting computer outputs, it requires a user to be familiar with the data being produced and can be hard to read and in particular hard to locate a subset of information which may be of interest to a particular user. In addition, if the data is to be transferred to another program, for example stored in SQL database, then the format must be consistent with the input requirements for that program. Therefore, in the present embodiment, it is possible for the user to select the output format, and indeed the output variables.

Figure 14:
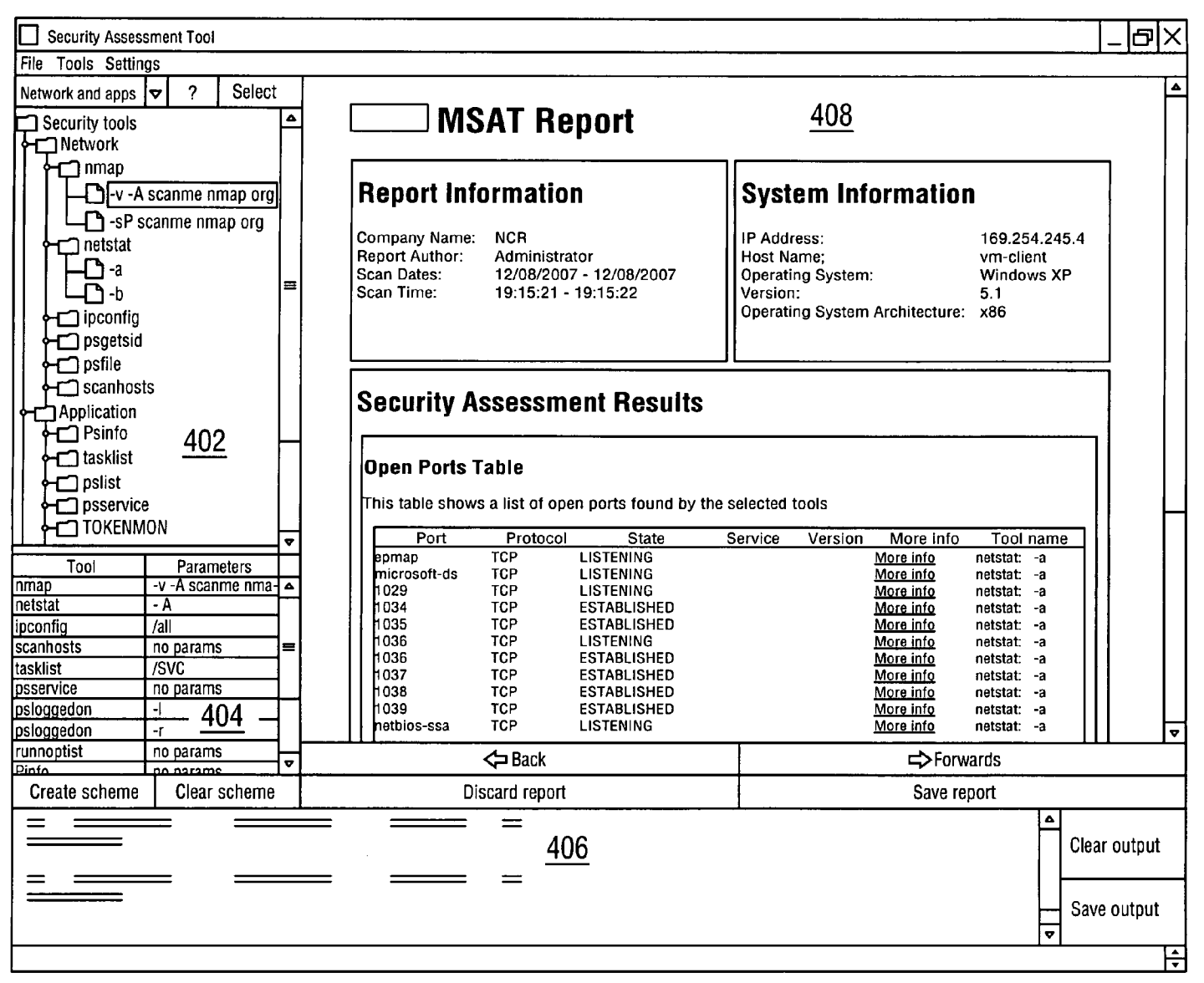

FIG. 14 shows a screenshot with the same output variables as FIG. 13 in (X)HTML.

FIG. 15 shows a report produced after running a second set of tools 206, in this case demonstrating how the results of a tool run with two separate parameters can be merged into a single report.

Figure 16:
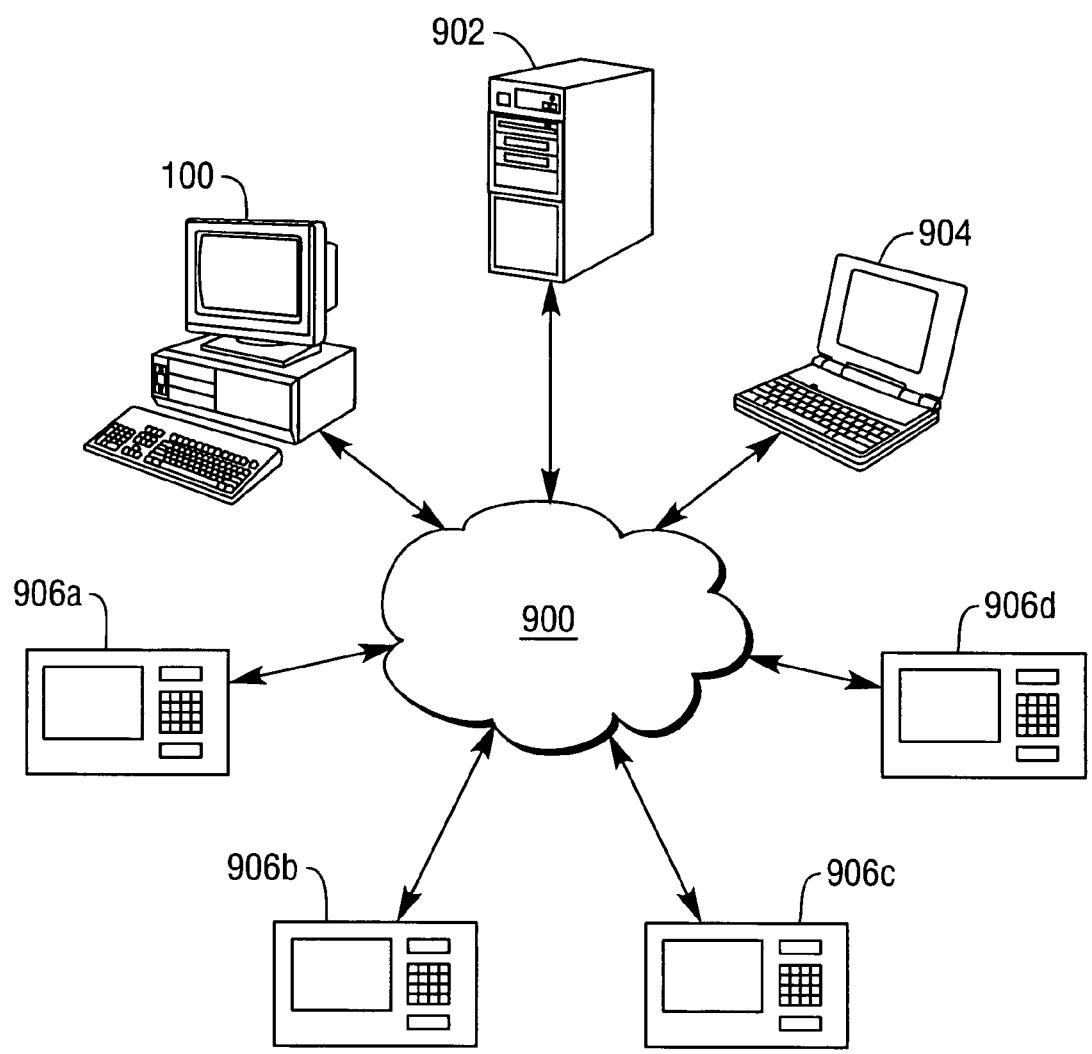
FIG. 16 shows an example of a network.
Figure 17:
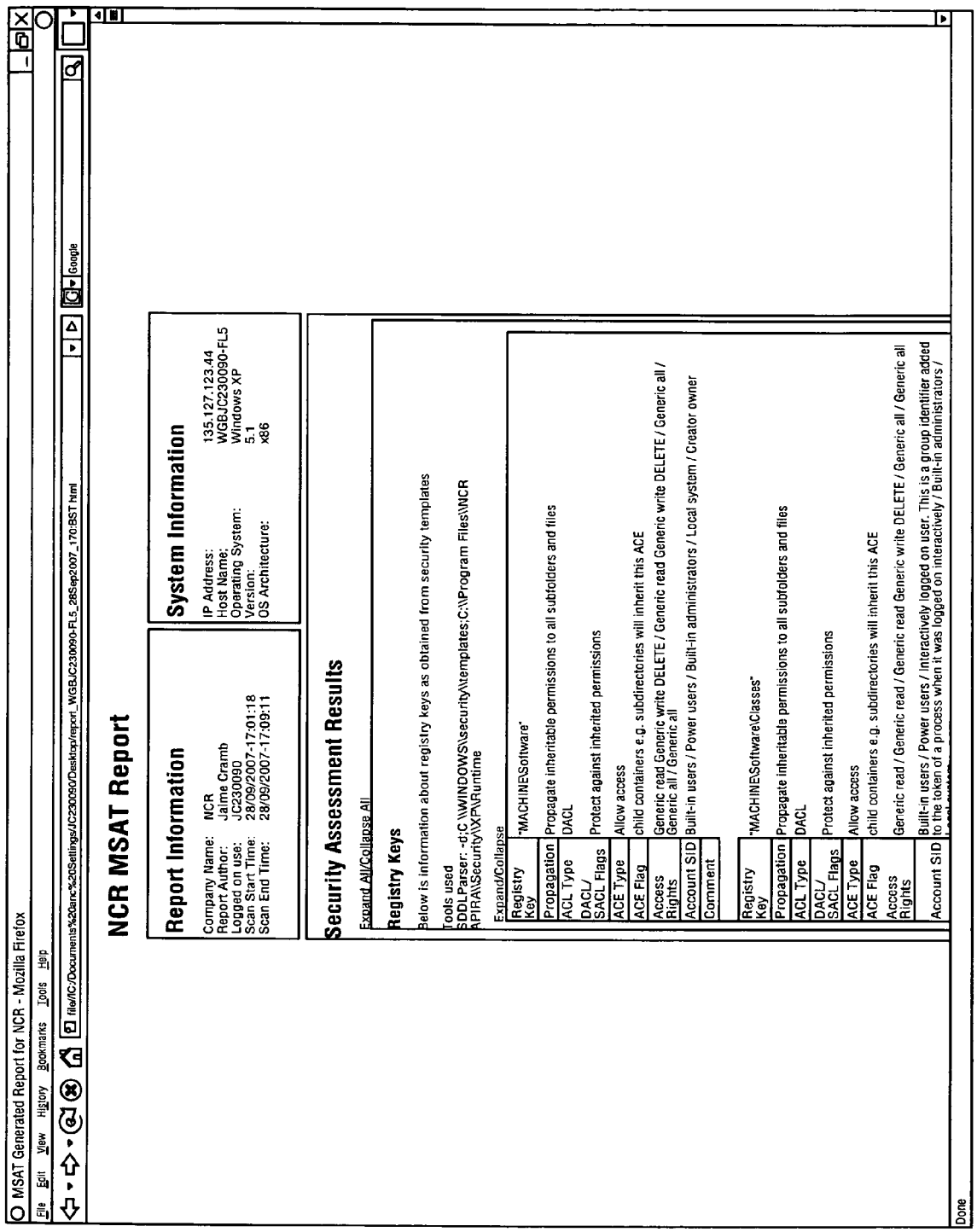
FIG. 17 shows an example of a web based report.

In one particular embodiment (described with reference to FIG. 16), the schemes are provided over a network and the end user is an ATM provider. The administrator builds a scheme arranged to perform a network assessment using their computer system 100, which is connected to the Internet 900 via its network connectivity port 114 (which in this example is an IP port). The scheme is then stored on a web server 902, which is also connected to the Internet 900. The end user is able to access the scheme using their own computer (shown in the Figure as a laptop computer 904). The scheme execution GUI is displayed to the end user though a website and the end user can then execute the scheme as described above in relation to FIG. 9. In this embodiment, the scheme is arranged to carry out a network assessment of ATMs 906 which are connected to the internet 900, and in particular to audit each ATM 906 to determine what software it is running, returning an inventory of the software on each machine 906 as the report, which is displayed to the end user on the screen of his computer 904 as a webpage. An example of such a web page is shown in FIG. 17.

In addition to building a scheme, an administrator is able to add new tools and parameters to the framework as it now described with reference to the screen shots of FIGS. 18 to 22.

Figure 18:
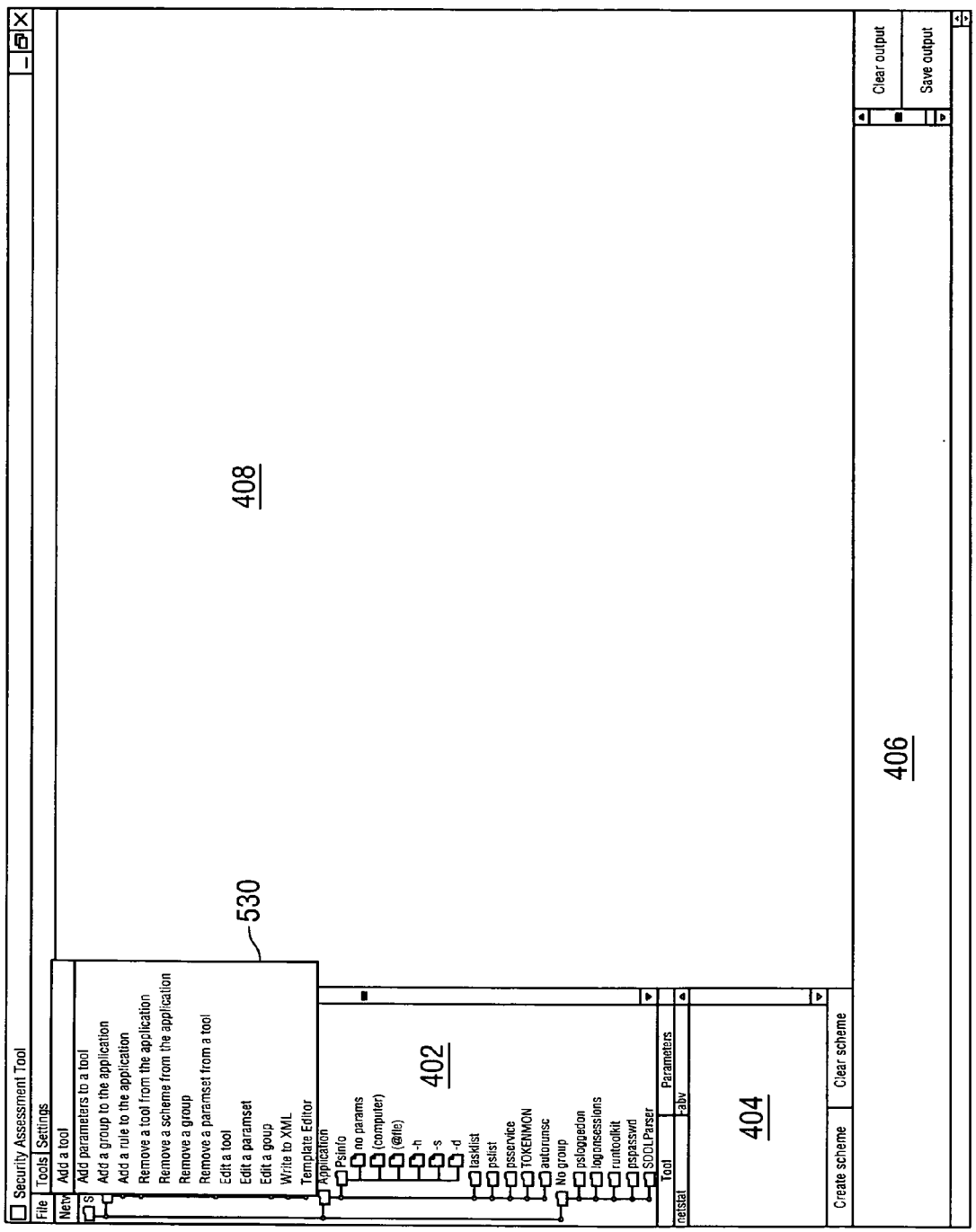
FIGS. 18 to 22 show screenshots of GUIs demonstrating steps in adding and editing tools in a framework.
Figure 19:
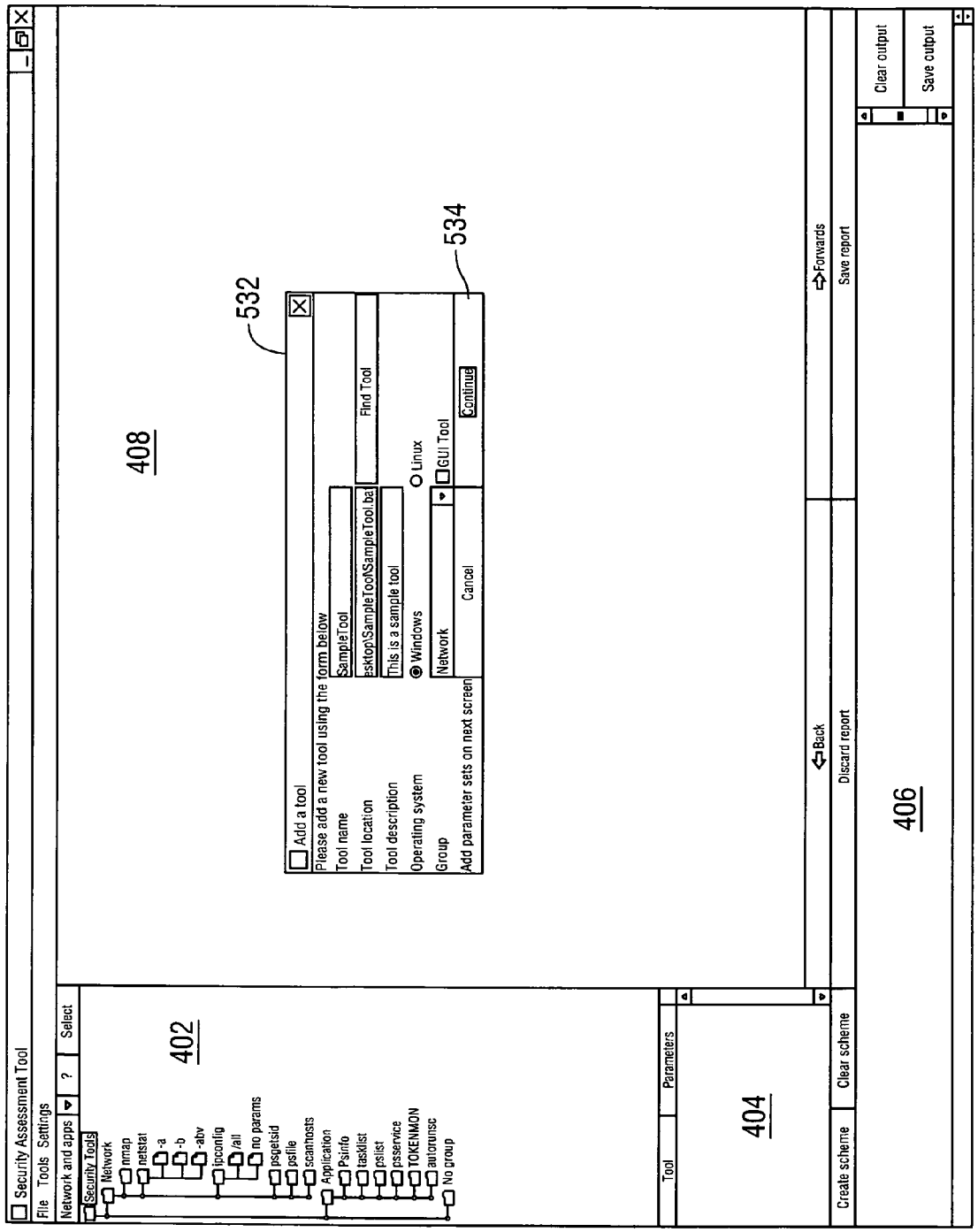

In FIG. 18, the administrator has used his or her mouse 108 to view a Tools menu 530. From this menu 530, the administrator chooses to add a tool by clicking on that option. The administrator is then shown the 'Add a Tool' GUI 532 as is shown in FIG. 19.

The 'Add a Tool' GUI 532 allows a user to identify the location of a tool in order to up-load it into the framework. In the example of the Figures a tool called 'SampleTool' is being added. The administrator is able to specify the tool name, a tool description and a tool type (e.g. network, application or no group). The tool itself will be stored within the Framework in a tool storage means 206, while the tool name and description will be stored in the tool attribute storage means 254. The tool description will appear as a tooltip, as described above.

Figure 20:
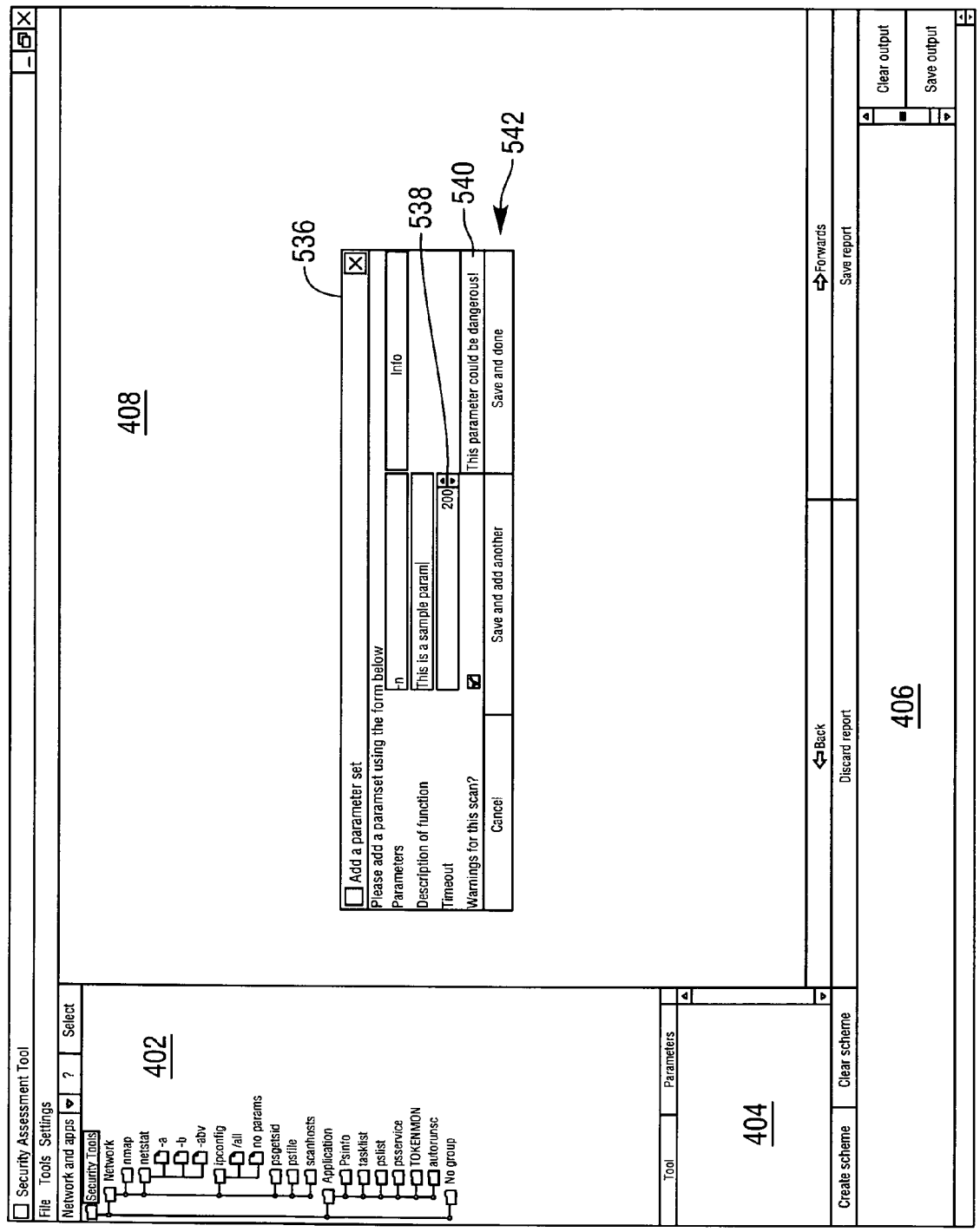

The 'Add a Tool' GUI 532 also comprises a 'continue' button 534, which allows the administrator to add parameters which may be associated with the tool. If the administrator clicks on the continue button 534, then the 'Add a Parameter set' GUI 536, as shown in FIG. 20, will be displayed. Again, the administrator is able to add a parameter and a description. The administrator may also add a 'Timeout' limit 538, which specifies how long the tool will be allowed to run without returning a result.

The administrator is also able to add a warning 540 to other users if executing the tool with that parameter is likely to cause a network or service disturbance. The administrator may then elect to cancel or save the tool and any entered parameters, or to add further parameters using buttons 542 on the 'Add a Parameter set' GUI 536.

Figure 21:
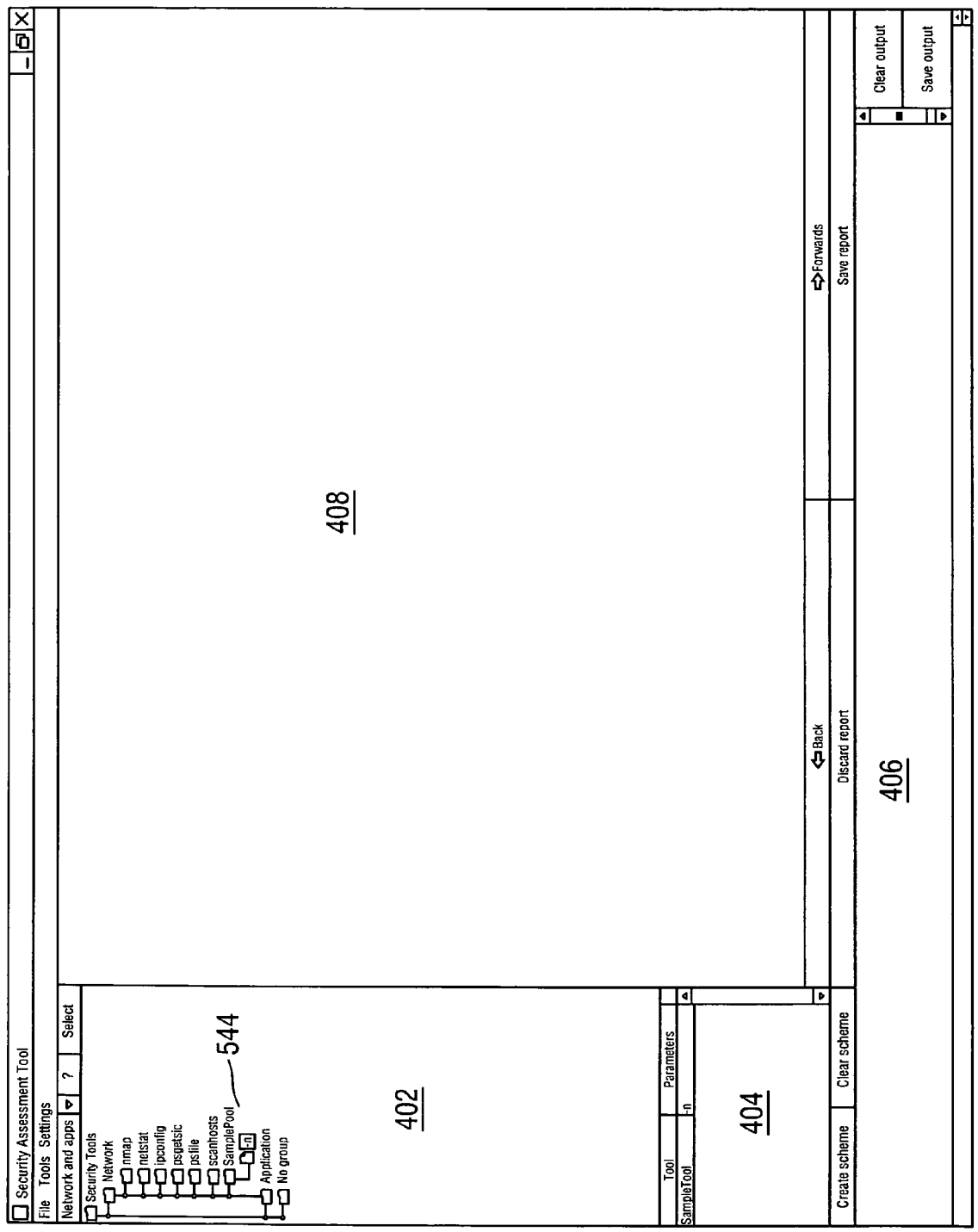

FIG. 21 shows the result of saving the tool and entered parameters. The sample tool and parameter 544 now appear within the tree hierarchy in the tool/parameter selection area 402 and may be selected by a user in building a scheme.

Figure 22:
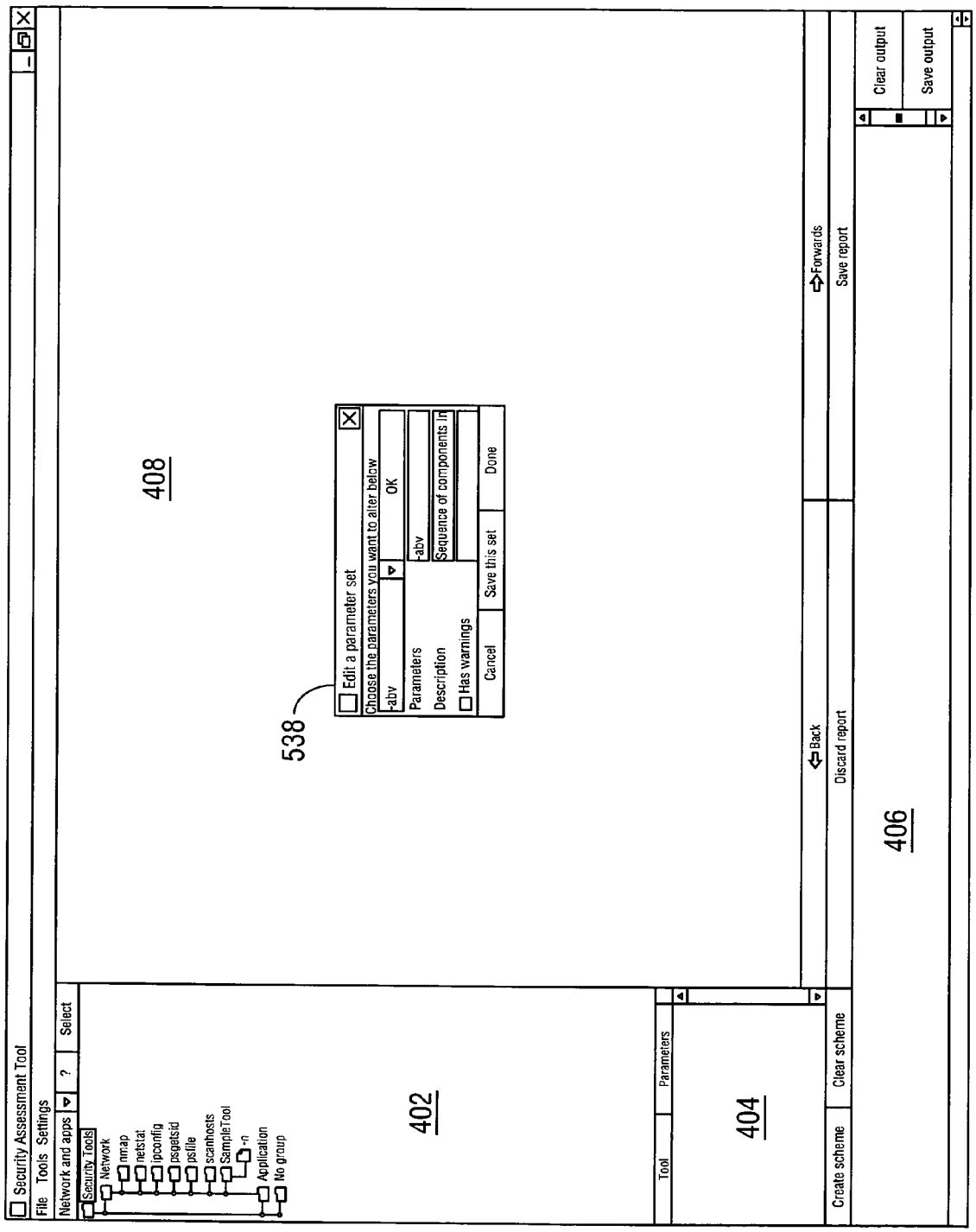

FIG. 22 shows an 'Edit a Parameter Set' GUI 538, which can also be accessed via the Tools menu 530. This allows the name, description or warning associated with a parameter to be amended or updated.

As will be appreciated by the person skilled in the art, other embodiments are possible. For example, while the tools described herein are designed to perform network security scans, the framework could alternatively or additionally be used for debugging, program testing, or other applications.

In some embodiments, a scheme may be developed with a given end user in mind (i.e. a bespoke scheme). In other embodiments, the end user and administrator roles may be combined—i.e. an end user/administrator may build a scheme for his or her own use. Alternatively, the end user may be able to edit existing schemes, but not to build an entire new scheme.

In one embodiment, there is an in-built knowledge base. This could operate, for example, if a user performs open port scan on a system to find out what ports are open to attach warnings from a knowledge base to the output, e.g. an open ports found list could have "TCP port 3245 open—warning this port is known to be used by a Trojan (backdoor) virus, please check to see if these valid services "x, y or z" are running and using the port, if not then please investigate for potential virus infection".

The knowledge base functionality may also be useful for a helpdesk scenario where mis-configurations found in a client's PC could be flagged up to the helpdesk representative and a note could be displayed telling him or her how to resolve the issue.

What is claimed is:

1. A method of operating a software framework to build an executable scheme which includes at least one software tool and at least one parameter associated with each software tool, the method comprising:

electronically by a processor presenting a first display screen of a graphical user interface (GUI) to allow a user to select at least one software tool from a plurality of software tools, wherein the first display screen provides information relating to the software tools;

electronically by a processor presenting a second display screen of the GUI to allow the user to select at least one parameter including a command line parameter for controlling execution of the software tool from a parameter set and to associate the parameter with a selected software tool, wherein second display screen provides information relating to the parameters; and electronically by a processor presenting a third display screen of the GUI to allow the user to associate the selected software tool and the selected parameter together in a scheme such that they are executable as a batch, and to place the selected software tool and the selected parameter into an order for execution.

2. A method according to claim 1, further comprising:

electronically by a processor presenting a fourth display screen of the GUI to allow the user to select a report format in which data returned following execution of the tools can be reported.

3. A method according to claim 2, wherein presenting a fourth display screen includes presenting a plurality of report output options.

4. A method according to claim 3, wherein the report options comprise at least one of data format, data content, presentation of the data, and order of the data.

5. A method according to claim 4, wherein at least some of the first, second, third, and fourth display screens comprise the same display screen.

6. A method according to claim 3, wherein presenting a fourth display screen includes presenting a drop down list to allow the user to select a report format.

7. A method according to claim 1, wherein the tools are categorized.

8. A method according to claim 1, wherein the scheme is arranged to carry out one or more of the following: a security assessment of a computer system or network, an inventory of software on a computer system or network, a status assessment of a network.

9. A method according to claim 1, wherein at least some of the first, second, and third display screens are presented to allow for the modification of existing tools.

10. A computer system for enabling a user to build an executable scheme, the computer system comprising:
    a screen; and
    a processor programmed to provide a graphical user interface (GUI) on the screen, wherein the GUI is arranged to present information relating to a plurality of software tools and parameters,
    to allow the user to select at least one software tool from a the plurality of software tools for the scheme, to select at least one parameter including a command line parameter for controlling execution of the software tool from a parameter set, to associate the selected parameter with a selected software tool, to associate the selected software tool and the selected parameter together in the scheme such that they are executable as a batch, and to place the selected software tool and the selected parameter into an order for execution.

11. A computer system according to claim 10, wherein the GUI is further arranged to allow the user to select a report format in which data returned following execution of the software tools are reported.

12. A computer system according to claim 11, wherein the GUI is further arranged to allow the user to allow the user to select from a plurality of report output options.

13. A computer system according to claim 12, wherein the GUI is further arranged to allow the user to select a report format from a drop down list.

14. A program storage medium readable by a computer having a memory, the medium tangibly embodying one or more programs of instructions executable by the computer to perform method steps for operating a software framework to build an executable scheme which includes at least one software tool and at least one parameter associated with each software tool, the method comprising the steps of:
    presenting a first display screen of a graphical user interface (GUI) to allow a user to select at least one software tool from a plurality of software tools, wherein the first display screen provides information relating to the software tools;
    presenting a second display screen of the GUI to allow the user to select at least one parameter including a command line parameter for controlling execution of the software tool from a parameter set and to associate the parameter with a selected tool, wherein second display screen provides information relating to the parameters;
    presenting a third display screen of the GUI to allow the user to associate the selected tool(s) and parameter(s) together in a scheme such that they are executable as a batch.

15. A program storage medium according to claim 14, further comprising the step of:
    presenting a fourth display screen of the GUI to allow the user to select a report format in which data returned following execution of the software tools are reported.

* * * * *